(12) United States Patent
Osawa

(10) Patent No.: US 11,418,726 B2
(45) Date of Patent: Aug. 16, 2022

(54) IMAGE PICKUP SYSTEM CAPABLE OF EXECUTING CONTINUOUS IMAGE PICKUP, IMAGE PICKUP APPARATUS, METHOD OF CONTROLLING IMAGE PICKUP APPARATUS, AND STORAGE MEDIUM

(71) Applicant: CANON KABUSHIKI KAISHA, Tokyo (JP)

(72) Inventor: Toshifumi Osawa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 376 days.

(21) Appl. No.: 16/435,921

(22) Filed: Jun. 10, 2019

(65) Prior Publication Data
US 2019/0394385 A1    Dec. 26, 2019

(30) Foreign Application Priority Data
Jun. 22, 2018 (JP) .............................. JP2018-119046

(51) Int. Cl.
*H04N 5/235* (2006.01)
(52) U.S. Cl.
CPC ......... *H04N 5/2357* (2013.01); *H04N 5/2351* (2013.01)
(58) Field of Classification Search
CPC .................. H04N 5/2357; H04N 5/2351
See application file for complete search history.

(56) References Cited

U.S. PATENT DOCUMENTS

| 9,288,374 B1* | 3/2016 | Cooper ............... H04N 5/23225 |
| 9,906,731 B2 | 2/2018 | Nakagawara |
| 2006/0152598 A1* | 7/2006 | Kawarada ............ H04N 5/2353 |
| | | 348/226.1 |
| 2019/0149711 A1* | 5/2019 | Okuike .................. H04N 5/243 |
| | | 348/294 |

FOREIGN PATENT DOCUMENTS

| JP | 2011254339 A | 12/2011 |
| JP | 2014220763 A | 11/2014 |
| JP | 2016039499 A | 3/2016 |

* cited by examiner

*Primary Examiner* — Twyler L Haskins
*Assistant Examiner* — Fayez A Bhuiyan
(74) *Attorney, Agent, or Firm* — Rossi, Kimms & McDowell LLP

(57) ABSTRACT

An image pickup system in which a plurality of image pickup apparatuses capable of performing continuous image pickup cooperate. At least one image pickup apparatus is set as a measurement apparatus for periodically detecting changes in brightness, caused by a light source, with respect to a subject of which an image is to be picked up, to generate light source flicker information during continuous image pickup. At least one image pickup apparatus is set as a reception apparatus for receiving the light source flicker information periodically transmitted from the measurement apparatus and executes each image pickup operation during continuous image pickup at a timing determined based on the light source flicker information received from the measurement apparatus.

9 Claims, 13 Drawing Sheets

FIG. 6A

COOPERATIVE FLICKERLESS IMAGE PICKUP SETTING 1

SETTING OF CAMERA FOR FLICKERLESS IMAGE PICKUP

| CAMERA-A | SET | |
| CAMERA-B | SET | |
| CAMERA-C | SET | |

601 — AUTOMATIC SETTING

[ CANCEL ]  [ OK ]

FIG. 6B

COOPERATIVE FLICKERLESS IMAGE PICKUP SETTING 2

SETTING OF CAMERA FOR PERFORM FLICKER DETECTION AFTER START OF IMAGE PICKUP

| CAMERA-A | | NOT SET |
| CAMERA-B | SET | |
| CAMERA-C | | NOT SET |

602 — AUTOMATIC SETTING

[ CANCEL ]  [ OK ]

COOPERATIVE FLICKERLESS IMAGE PICKUP
(BEFORE STARTING CONTINUOUS IMAGE PICKUP)

COOPERATIVE FLICKERLESS IMAGE PICKUP
(AFTER STARTING CONTINUOUS IMAGE PICKUP)

(a) CAMERA-A (b) CAMERA-B (c) CAMERA-C

TIME (t)

IMAGE PICKUP SYSTEM CAPABLE OF EXECUTING CONTINUOUS IMAGE PICKUP, IMAGE PICKUP APPARATUS, METHOD OF CONTROLLING IMAGE PICKUP APPARATUS, AND STORAGE MEDIUM

BACKGROUND OF THE INVENTION

Field of the Invention

The present invention relates to an image pickup system that causes a plurality of image pickup apparatuses to cooperate with each other to thereby improve performance of the image pickup apparatuses.

Description of the Related Art

Image pickup apparatuses include one that is capable of continuously picking up images. In this case, it is desirable that during continuous image pickup, similar to single image pickup, the image pickup apparatus is capable of controlling image pickup by measuring the luminance of a subject or the like, at each of image pickup operations. An image pickup apparatus disclosed in Japanese Laid-Open Patent Publication (Kokai) No. 2014-220763 detects changes in brightness, caused by a light source, of a subject of which an image is to be picked up, using a photometric sensor for measuring the luminance of the subject at each of image pickup operations during continuous image pickup, and suppresses the adverse effects of flicker of the light source (light source flicker) at each image pickup operation during continuous image pickup.

However, in a case where light receiving processing for suppressing the influence of light source flicker is performed using the photometric sensor for measuring the luminance of a subject of which an image is to be picked up at each image pickup operation during continuous image pickup, an image pickup interval in continuous image pickup is increased. That is, the image pickup apparatus needs a light receiving time period for measuring the luminance of a subject of which an image is to be picked up using the photometric sensor and a light receiving time period for measuring the light source flicker using the photometric sensor. Further, the light source flicker is basically caused by a commercial AC power supply, and hence at least approximately 10 msec is required as the light receiving time period for measuring light source flicker. Therefore, the image pickup interval in continuous image pickup, in which light receiving processing for suppressing the influence of light source flicker is performed, is longer in time than a normal image pickup interval in a case where the light source flicker is not suppressed, at least by a time period of approximately 10 msec which is the light receiving time period for measuring light source flicker. Particularly, in high-speed continuous image pickup in which a time period for picking up images to be recorded is short, the increase of the image pickup interval due to the light receiving time period for suppressing the influence of light source flicker has a great influence. Therefore, in such image pickup apparatuses, it is desired that the influence of light source flicker is suppressed while preventing the image pickup interval in continuous image pickup from being increased.

SUMMARY OF THE INVENTION

The present invention provides an image pickup apparatus for receiving light source flicker information, which is capable of suppressing the influence of light source flicker while preventing an image pickup interval in continuous image pickup from being increased, an image pickup system including the image pickup apparatus, a method of controlling the image pickup apparatus, and a storage medium.

In a first aspect of the present invention, there is provided an image pickup apparatus comprising a photometric sensor for measuring a luminance of a subject of which an image is to be picked up, and at least one processor or circuit configured to perform the operations of the following units a flicker information generation unit configured to detect changes in brightness, caused by a light source, with respect to the subject, using the photometric sensor, to generate first flicker information, a communication unit configured to periodically receive, from an other apparatus different from the image pickup apparatus, second flicker information generated by the other apparatus, during continuous image pickup, and a control unit configured to control execution of each image pickup operation during the continuous image pickup, wherein the control unit controls execution of each image pickup operation during the continuous image pickup such that the image pickup operation is executed at a timing determined based on the second flicker information periodically received from the other apparatus by the communication unit without causing the flicker information generation unit to generate the first flicker information.

In a second aspect of the present invention, there is provided an image pickup system that causes a plurality of image pickup apparatuses capable of performing continuous image pickup to cooperate with each other, wherein the plurality of image pickup apparatuses include communication units which can communicate with each other, respectively, wherein at least one image pickup apparatus for measurement as part of the plurality of image pickup apparatuses, comprises a photometric sensor for measuring a luminance of a subject of which an image is to be picked up, and at least one processor or circuit configured to perform the operation of a flicker information generation unit configured to periodically detect changes in brightness, caused by a light source, with respect to the subject, using the photometric sensor, to generate flicker information, during continuous image pickup, and transmits the flicker information periodically generated during the continuous image pickup from a communication unit of its own, and wherein at least one image pickup apparatus for reception as the rest of the plurality of image pickup apparatuses receives the flicker information of the image pickup apparatus for measurement, periodically transmitted from the communication unit of the image pickup apparatus for measurement, during the continuous image pickup, by the communication unit of the image pickup apparatus for reception, and comprises at least one processor or circuit configured to perform the operation of a control unit configured to control execution of each image pickup operation during continuous image pickup such that the image pickup operation is executed at a timing determined based on the flicker information of the image pickup apparatus for measurement, periodically received during the continuous image pickup.

In a third aspect of the present invention, there is provided a method of controlling an image pickup apparatus that includes a photometric sensor for measuring a luminance of a subject of which an image is to be picked up, comprising detecting changes in brightness, caused by a light source, with respect to the subject, to generate first flicker information using the photometric sensor, periodically receiving, from another apparatus, second flicker information generated by the other apparatus, during continuous image pickup, and executing each image pickup operation at a timing determined based on the second flicker information periodically received from the other apparatus, without generating the first flicker information, during the continuous image pickup.

In a fourth aspect of the present invention, there is provided a non-transitory computer-readable storage medium storing a computer-executable program for executing a method of controlling an image pickup apparatus that includes a photometric sensor for measuring a luminance of a subject of which an image is to be picked up, wherein the method comprises detecting changes in brightness, caused by a light source, with respect to the subject, to generate first flicker information using the photometric sensor, periodically receiving, from another apparatus, second flicker information generated by the other apparatus, during continuous image pickup, and executing each image pickup operation at a timing determined based on the second flicker information periodically received from the other apparatus, without generating the first flicker information, during the continuous image pickup.

According to the image pickup apparatus for receiving light source flicker information in the image pickup system of the present invention, it is possible to suppress the influence of light source flicker while preventing the image pickup interval in continuous image pickup from being increased.

Further features of the present invention will become apparent from the following description of exemplary embodiments (with reference to the attached drawings).

BRIEF DESCRIPTION OF THE DRAWINGS

FIGS. 6A and 6B are views each showing an example of a screen for setting cooperative flickerless image pickup.

DESCRIPTION OF THE EMBODIMENTS

The present invention will now be described in detail below with reference to the accompanying drawings showing an embodiment thereof. The following description of the configuration of the embodiment is given by way of example, and the scope of the present invention is not limited to the described configuration of the embodiment.

Figure 1:
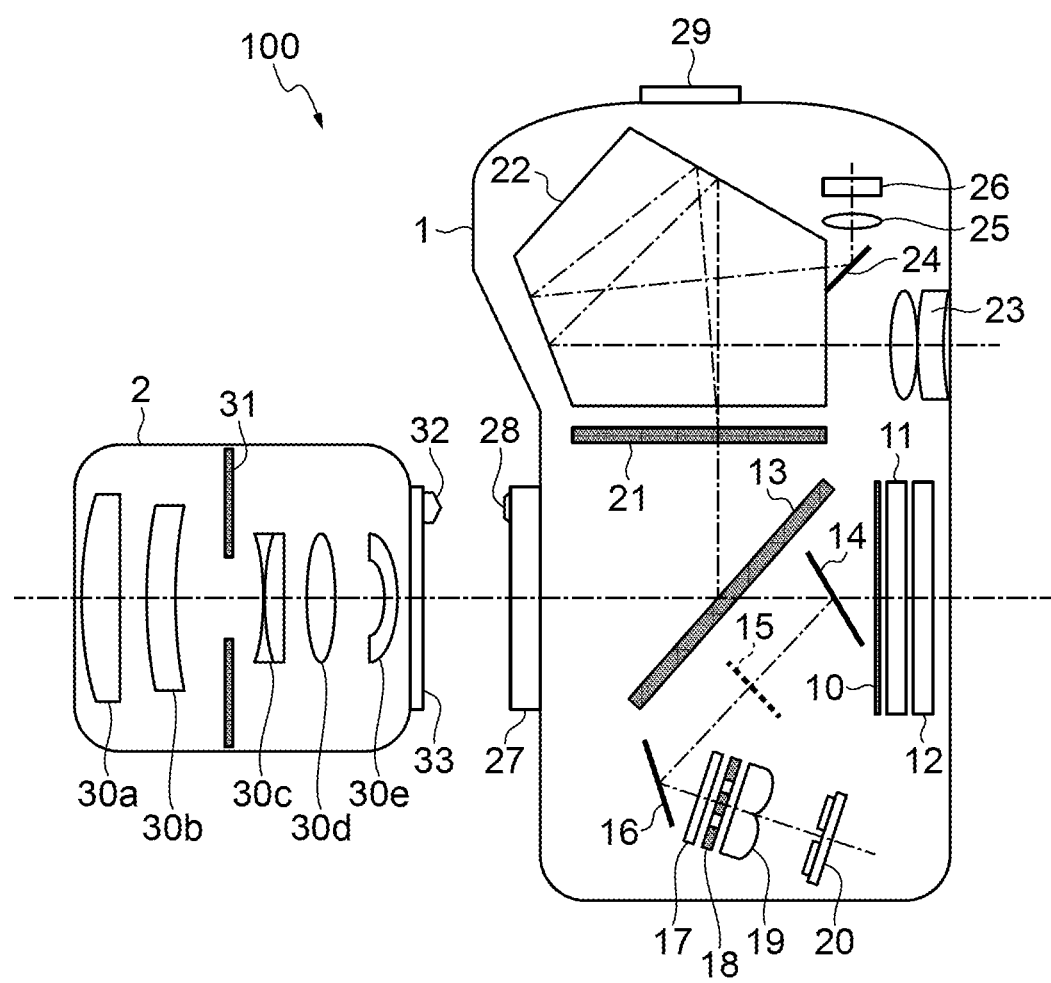
FIG. 1 is a cross-sectional view schematically showing a structure of a camera as an image pickup apparatus according to an embodiment of the present invention.

FIG. 1 is a cross-sectional view schematically showing a structure of a camera 100 as an image pickup apparatus according to the embodiment of the present invention. The camera 100 shown in FIG. 1 is a lens-interchangeable single-lens reflex-type camera having a camera body 1 and an interchangeable lens 2. The interchangeable lens 2 includes a plurality of optical lenses 30a to 30e, a diaphragm 31, a contact portion 32 used for communication with the camera body 1 and a mount portion 33 which is mounted to the camera 100. The camera body 1 includes a mount portion 27 for mounting the interchangeable lens 2, a contact portion 28 used for communication with the interchangeable lens 2, and a connection portion 29 for mounting a flash device or the like. The camera body 1 includes a focal plane shutter 10, an optical lowpass filter 11, and an image pickup device 12 implemented by area accumulation-type photoelectric conversion elements, such as a CMOS or CCD, which are arranged along an optical axis of the interchangeable lens 2 so as to pick up an image to be recorded. Further, a semi-transparent main mirror 13 and a first reflective mirror 14 are arranged along the optical axis of the interchangeable lens 2. In a case where an image to be recorded is picked up, the main mirror 13 and the first reflective mirror 14 are mechanically flipped upward as viewed in FIG. 1. As a result, light of a subject image, condensed by the interchangeable lens 2, can enter the image pickup device 12. The camera body 1 includes a second reflective mirror 16 which reflects light reflected by the first reflective mirror 14, an infrared cut filter 17, a diaphragm 18 having two openings, a secondary image forming lens 19, and a focus detection sensor 20. In FIG. 1, reference numeral 15 denotes a paraxial image forming surface receiving light reflected by the first reflective mirror 14, which is conjugate with a light receiving surface of the image pickup device 12. The focus detection sensor 20 has accumulation-type photoelectric conversion elements arranged in lines or in areas, and detects a focus based on an image shift method using two light receiving positions corresponding to the two openings of the diaphragm 18. The camera body 1 includes a diffusion focusing plate 21, a pentaprism 22, and an eyepiece lens 23, which are arranged along a direction in which light reflected by the main mirror 13 advances, so as to enable a user to optically confirm a subject of which an image is to be picked up via a viewfinder. The camera body 1 includes a third reflective mirror 24, a condensing lens 25, and a photometric sensor 26, which are arranged along a direction in which light divided by the focusing plate 21 advances, so as to measure the luminance of the subject. In a case where the main mirror 13 is flipped up, light from the subject does not enter the photometric sensor 26.

Figure 2A:
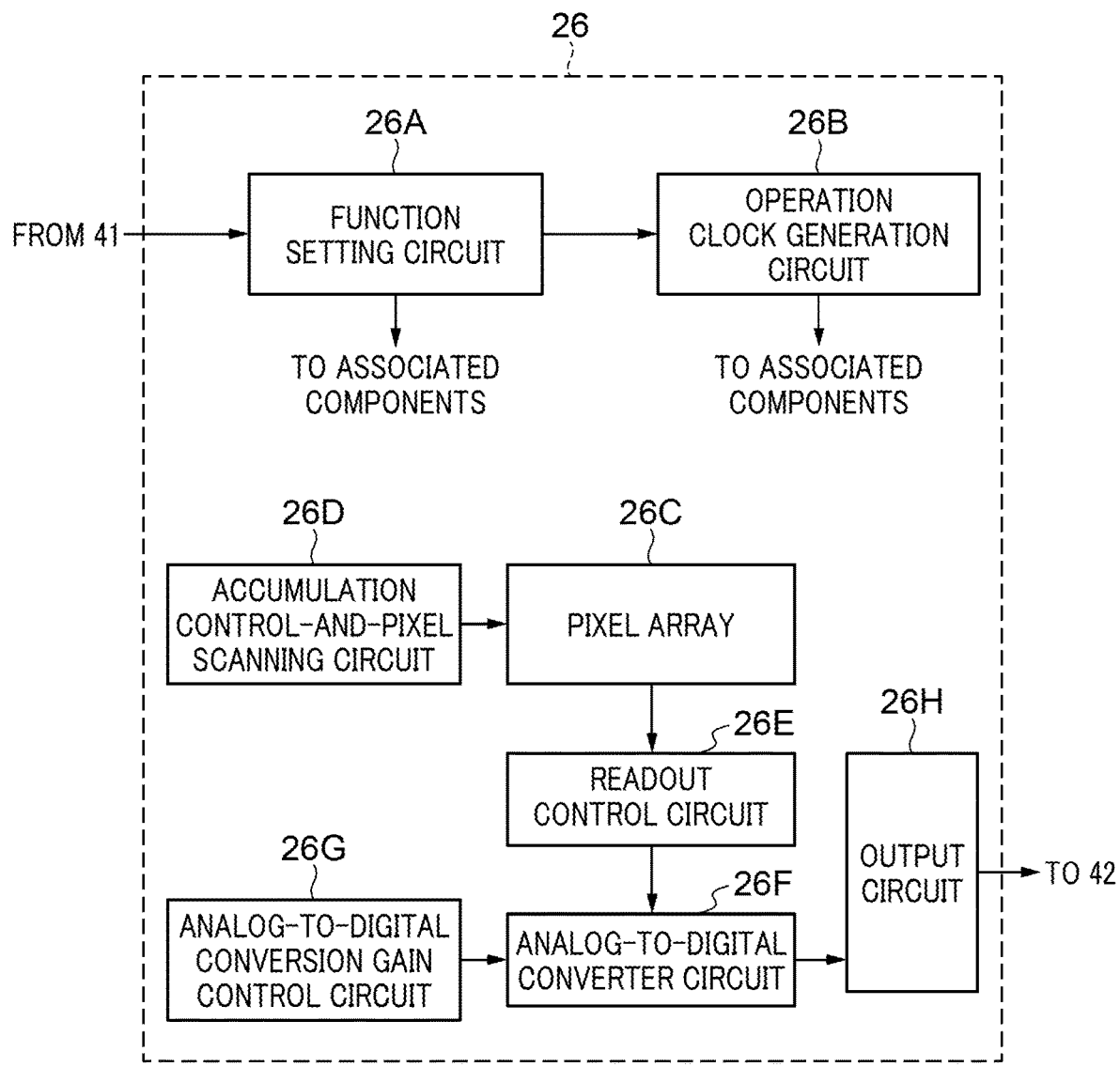
FIGS. 2A and 2B are diagrams useful in explaining a photometric sensor for measuring the luminance of a subject of which an image is to be picked up by the camera shown in FIG. 1.
Figure 2B:
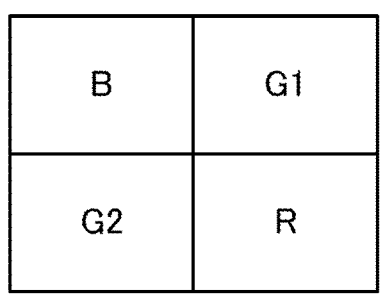

FIGS. 2A and 2B are diagrams useful in explaining the photometric sensor 26 for measuring the luminance of a subject of which an image is to be picked up by the camera 100 shown in FIG. 1. FIG. 2A is a block diagram showing an example of the internal configuration of the photometric sensor 26. The photometric sensor 26 shown in FIG. 2A includes a function setting circuit 26A, an operation clock generation circuit 26B, a pixel array 26C, an accumulation control-and-pixel scanning circuit 26D, a readout control circuit 26E, an analog-to-digital converter circuit 26F, an analog-to-digital conversion gain control circuit 26G, and an output circuit 26H. The function setting circuit 26A performs function setting for the operation clock within the sensor, accumulation control, and analog-to-digital conversion control, according to data sent from a control unit 41, described hereinafter. The operation clock generation circuit 26B generates an operation clock within the sensor. The pixel array 26C is an array of accumulation-type photoelectric conversion elements, such as a CMOS array, arranged in an area, for forming tens of thousands to hundreds of thousands of pixels. In the pixel array 26C, as shown in FIG. 2B, one combination of the color filters of a blue transmitting filter B, green transmitting filters G1 and G2, and a red transmitting filter R disposed in the Bayer array forms one unit in the array. In this case, not only information on a luminance of an image, but also information on color can be obtained from the pixel array 26C. The accumulation control-and-pixel scanning circuit 26D controls charge accumulation in the pixel array 26C, and controls scanning of pixels in readout processing. The readout control circuit 26E sequentially reads out analog signals indicative of charges accumulated in respective pixels of the pixel array 26C according to the setting set by the function setting circuit 26A. The accumulation control-and-pixel scanning circuit 26D and the readout control circuit 26E execute different types of readout processing between a case where signals indicative of charges accumulated are read out from all lines, which makes it possible to perform face detection, and a case where signals indicative of charges accumulated are read out by thinning readout in which the number of readout lines is reduced. The analog-to-digital converter circuit 26F converts the analog signals output from the readout control circuit 26E to digital data. The analog-to-digital conversion gain control circuit 26G adjusts a conversion gain set for the analog-to-digital converter circuit 26F. The output circuit 26H outputs signal data converted to the digital data to a signal processing circuit 42, described hereinafter, after performing parallel-serial conversion processing and conversion to a differential signal, as required.

Figure 3:
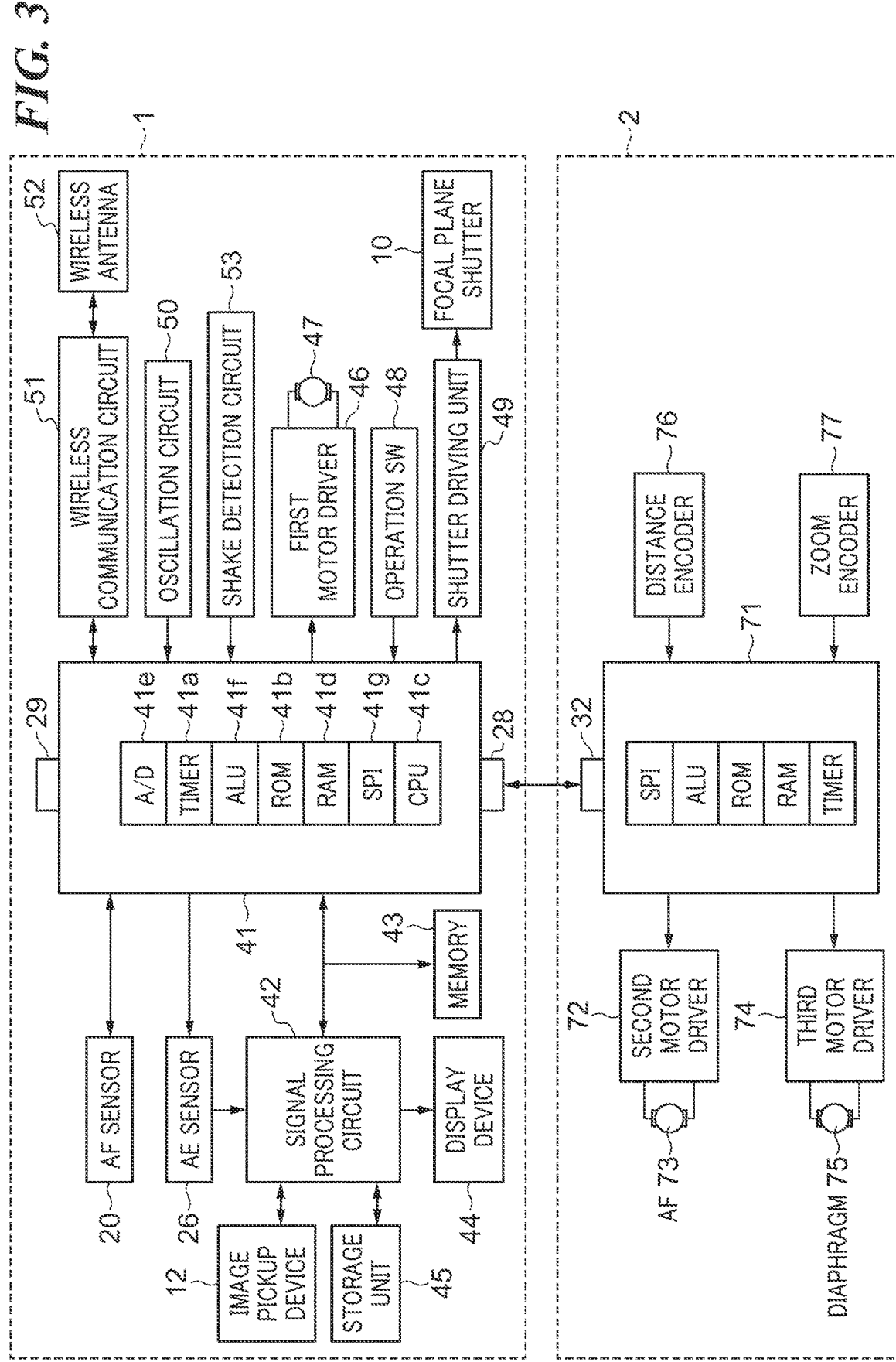
FIG. 3 is a block diagram of a control system of the camera shown in FIG. 1.

FIG. 3 is a block diagram of a control system of the camera 100 shown in FIG. 1. The control system shown in FIG. 3 is formed by a control system of the camera body 1 and a control system of the interchangeable lens 2. The control system of the camera body 1 includes the control unit 41. The control unit 41 may be implemented by e.g. a one-chip microcomputer including an analog-to-digital converter 41e, a timer 41a, an ALU 41f, a ROM 41b, a RAM 41d, a serial communication port (SPI) 41g, and a CPU 41c. The CPU 41c loads control programs of the camera 100 stored e.g. in the ROM 41b into the RAM 41d, and executes them. The CPU 41c acquires data necessary for processing based on the control programs, and stores the acquired data in the RAM 41d. Thus, the control unit 41 that controls the overall operation of the camera 100 is realized. The focus detection sensor 20, the photometric sensor 26, the signal processing circuit 42, a memory 43, a first motor driver 46, and an operating switch 48 are connected to the control unit 41. Further, the contact portion 28 brought into contact with the interchangeable lens 2, the connection portion 29 connected to e.g. a flash device, a shutter driving unit 49, an oscillation circuit 50, a wireless communication circuit 51, and a shake detection circuit 53 are connected to the control unit 41. The image pickup device 12, a storage unit 45, such as a semi-conductor memory card, a display device 44, such as a touch panel display, and the photometric sensor 26 are connected to the signal processing circuit 42. The signal processing circuit 42 executes predetermined processing instructed by the control unit 41 according to an instruction from the control unit 41. The signal processing circuit 42 controls the image pickup device 12, and obtains image signals by converting image pickup signals output from the image pickup device 12 from analog to digital. The signal processing circuit 42 performs necessary image processing, such as compression processing, on the image signals, and records the processed signals in the storage unit 45. With this, the control unit 41 can record a picked-up image using the signal processing circuit 42. The signal processing circuit 42 displays an image being picked up, a picked-up image, various setting screens, and so on, on the display device 44 according to instructions from the control unit 41. The signal processing circuit 42 executes processing based on a signal output from the photometric sensor 26 according to an instruction from the control unit 41. For example, the signal processing circuit 42 calculates the luminance of a subject of which an image is to be picked up. The memory 43 is e.g. a DRAM. The memory 43 is used as a work memory for various signal processing performed by the signal processing circuit 42. The memory 43 is also used as a VRAM for storing image data to be displayed on the display device 44. The first motor driver 46 drives a first motor 47 to drive the main mirror 13 and the first reflective mirror 14 up and down, and controls charging of the focal plane shutter 10 according to an instruction from the control unit 41. The operating switch 48 includes a release switch used for instructing the start of image pickup. The operating switch 48 delivers a signal based on a user's operation, to the control unit 41. The shutter driving unit 49 is connected to an output terminal of the control unit 41 and to the focal plane shutter 10 appearing in FIG. 1 to drive the same. The oscillation circuit 50 is e.g. a crystal oscillator, and supplies a clock signal necessary for the operation of the control unit 41 and time measurement. The control unit 41 detects the frequency and phase of light source flicker, referred to hereinafter, based on the clock signal. The wireless communication circuit 51 performs data communication with other cameras 100 via a wireless antenna 52. When a link which enables data communication with the other camera(s) 100 is established, the plurality of cameras 100 are enabled to operate in cooperation. This makes it possible for a user operating one camera 100 to simultaneously operate the plurality of cameras 100. The shake detection circuit 53 is a vibrating gyroscope or the like. The shake detection circuit 53 outputs information on a shake of the camera 100 to the control unit 41. The control unit 41 can judge stability of the camera 100 based on this shake information to thereby determine whether the camera 100 is in a state fixed e.g. to a tripod and hardly shaken, or in a state being held by hand and liable to be shaken. The contact portion 28 brought into contact with the interchangeable lens 2 is electrically connected to the contact portion 32 of the interchangeable lens 2 when the interchangeable lens 2 is mounted to the camera body 1.

The control system of the interchangeable lens 2 includes a lens control unit 71 implemented by a one-chip microcomputer. The one-chip microcomputer implementing the lens control unit 71 may be of the same type as that implementing the control unit 41. A second motor driver 72, a third motor driver 74, a distance encoder 76, and a zoom encoder 77 are connected to the lens control unit 71. The lens control unit 71 performs data communication with the control unit 41 of the camera body 1. The lens control unit 71 executes predetermined processing instructed by the control unit 41 according to an instruction from the control unit 41. When the lens control unit 71 inputs an instruction received from the control unit 41 to the second motor driver 72, the second motor driver 72 drives a second motor 73 for performing focus adjustment. Further, similarly, the third motor driver 74 drives a third motor 75 for controlling the diaphragm 31. The distance encoder 76 outputs information on an extended amount of a focus adjustment lens, i.e. a subject distance, to the lens control unit 71. In a case where the interchangeable lens 2 is a zoom lens, the zoom encoder 77 outputs focal distance information at image pickup to the lens control unit 71. The lens control unit 71 transmits the acquired information to the control unit 41.

Incidentally, the image pickup environment of the camera 100 is by no means necessarily be an environment under the sun light. The camera 100 sometimes performs image pickup under an environment lighted by a light source. Under the environment lighted by a light source, the brightness of a subject of which an image is to be picked up depends on the brightness of the light source. Therefore, if the brightness of the light source periodically changes according to a commercial power supply or the like, the brightness of the subject also periodically changes.

Figure 4A:
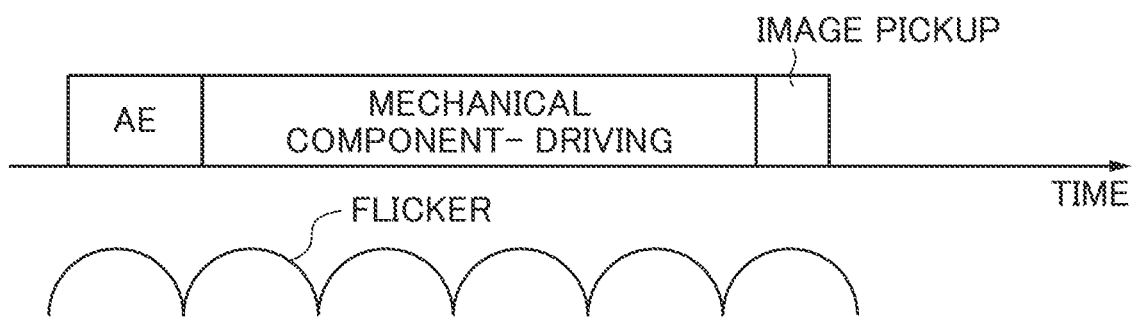
FIGS. 4A to 4C are diagrams useful in explaining influence of light source flicker, i.e. changes in brightness of a subject caused by changes in brightness of a light source, on a picked-up image and an image pickup time period.
Figure 4B:
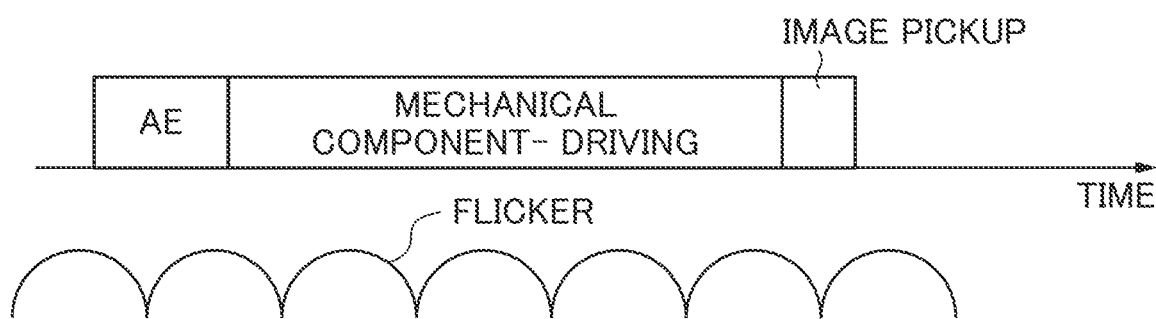
Figure 4C:
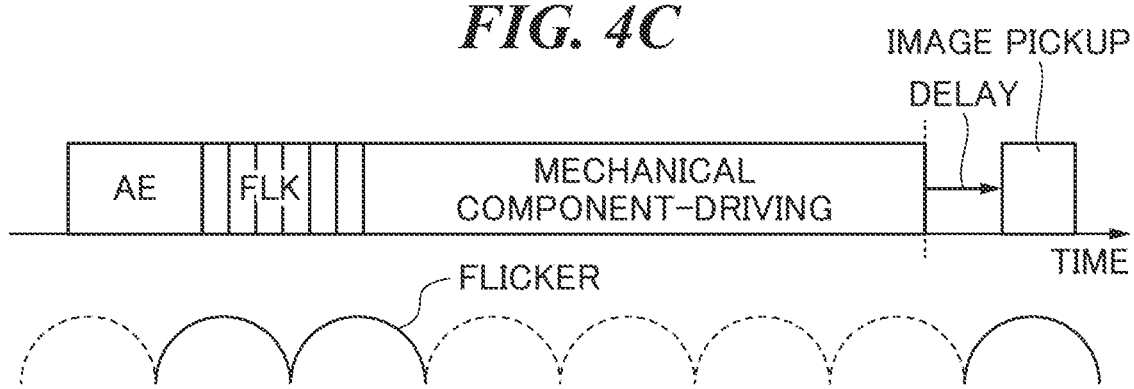

FIGS. 4A to 4C are diagrams useful in explaining influence of light source flicker, i.e. changes in brightness of a light source, causing changes in brightness of a subject, on a picked-up image and an image pickup time period. FIGS. 4A and 4B are diagrams useful in explaining correspondence between the image pickup environment and image pickup processing by the camera 100 which does not take a countermeasure against light source flicker. FIG. 4A shows the normal image pickup processing of the camera 100, performed when an image pickup operation for recording an image is performed, in association with a waveform of the luminance of a subject, which corresponds to light source flicker. FIG. 4B also shows the same. In the diagrams shown FIGS. 4A and 4B, time elapses from left to right. When an image is picked up and recorded by the image pickup processing, first, the camera 100, which does not take a countermeasure against light source flicker, measures the luminance of the subject using the photometric sensor 26 in an AE (Automatic Exposure) period. Next, the camera 100 flips up the main mirror 13 and the like in a mechanical components-driving period, and picks up an image to be recorded at an image pickup timing. In this case, the image pickup period is a time period which takes to complete the whole of the above-described process. In FIG. 4A, the brightness of the light source is at peak at the image pickup timing for obtaining an image to be recorded. In this case, an image of the subject is picked up at the timing of the bright phase of the light source flicker, and can be brightly picked up in the recorded image with a proper luminance. On the other hand, in FIG. 4B, the brightness of the light source is at bottom at the image pickup timing for obtaining an image to be recorded. In this case, an image of the subject is picked up at the timing of the dark phase of the light source flicker, and is darkly picked up in the recorded image even though the luminance of the subject is detected and image pickup is controlled based on the detected luminance. In the case where image pickup is performed under an environment lighted by the light source as described above, the brightness of the subject is reduced depending on image pickup timing.

Therefore, it is desirable that the camera 100 takes a countermeasure against light source flicker.

FIG. 4C is a diagram useful in explaining correspondence between the image pickup environment and image pickup processing by the camera 100 which takes a countermeasure against light source flicker. The camera 100 which takes a countermeasure against light source flicker measures the luminance of the subject using the photometric sensor 26 during the AE period, measures light source flicker using the photometric sensor 26 in a FLK (Flicker) period, and flips up the main mirror 13 and the like, in the mechanical components-driving period. After that, in a case where light source flicker is detected by the measurement, the camera 100 performs processing for delaying the image pickup timing such that the image pickup operation is performed at a timing in the vicinity of peak of the brightness, and picks up the image to be recorded at the delayed image pickup timing. In the case where the countermeasure is taken against light source flicker, the image pickup period is a time period to complete the whole of the above-described process. Thus, in a case where the countermeasure is taken against light source flicker, the image pickup period for recoding one image is increased, compared with the case where the countermeasure is not taken against light source flicker.

To positively obtain information on the timing of the bright phase of light source flicker, it is necessary to measure and sample light source flicker over a time period corresponding to one period of changes in brightness/darkness (changes in luminance) of light source flicker. The frequency of the commercial power supply mostly used in various places in the world is 50 Hz or 60 Hz. The frequency of light source flicker in this case is normally 100 Hz or 120 Hz. To cope with these frequencies, it is necessary to set the FLK period for measuring light source flicker to a time period of at least approximately 10 ms. Further, as the sampling interval in the FLK period is shorter, the accuracy of detection of the timing of the bright phase of light source flicker is higher. Therefore, it is desirable that the photometric sensor 26 performs sampling with fine temporal resolution which enables sampling at a period which is at least not larger than a fraction of the period of light source flicker. Further, as the photometric sensor 26, shown in FIG. 2A, for measuring the luminance of a subject image, the recent camera 100 uses a light receiving sensor having a large number of pixels not less than one hundred thousand pixels. This makes it possible to obtain not only information on the luminance of the subject, but also highly accurate information for improving image pickup of the subject, such as face detection information, from an image generated by the photometric sensor 26. However, the increase of the number of pixels of the photometric sensor 26 increases the time for readout from the photometric sensor 26. This prevents the photometric sensor 26 from performing sampling with a fine temporal resolution. Therefore, to perform sampling at a period corresponding to a fraction of the period of light source flicker, the photometric sensor 26 is caused to read out data by line addition or line thinning-out of data of a plurality of pixels, so as to reduce the readout time. For this reason, when the photometric sensor 26 is used to measure the luminance of a subject and measure light source flicker, the camera 100 separately performs these processing operations (measurement of the luminance of a subject and measurement of light source flicker) as shown in FIG. 4C.

Further, the speed of continuous image pickup performed by recent digital cameras is markedly improved, and a model that is capable of picking up more than 10 frames per second is not rare. In this high-speed continuous image pickup, addition of the FLK period for measuring light source flicker between frames as shown in FIG. 4C causes degradation of the performance of high-speed continuous image pickup. Further, a user may feel in continuous image pickup that the image pickup speed is low, compared with a camera 100 that does not take a countermeasure against light source flicker. Thus, it is desired that the image pickup apparatuses, such as the camera 100, can suppress the influence of light source flicker while preventing an increase of the image pickup interval in continuous image pickup. The detailed description of the present embodiment that takes the countermeasure is given hereafter.

Figure 5:
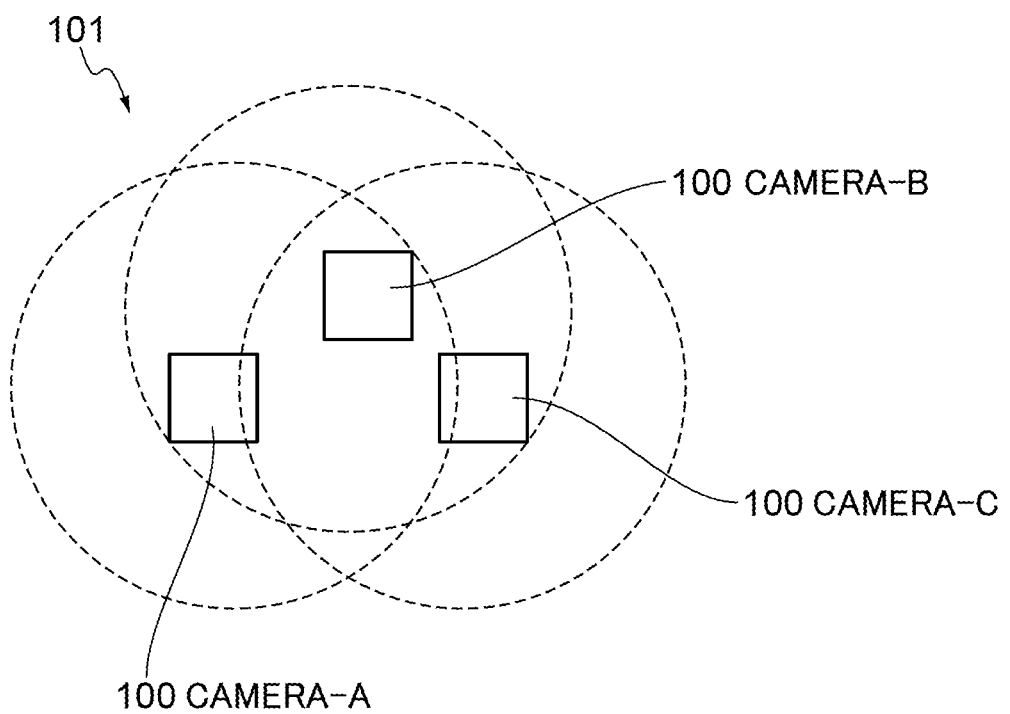
FIG. 5 is a diagram useful in explaining an example of an image pickup system according to the present embodiment.

FIG. 5 is a diagram useful in explaining an example of an image pickup system 101 according to the present embodiment. The image pickup system 101 shown in FIG. 5 includes three of the above-described cameras 100. Referring to FIG. 5, a dot-line frame appearing around each camera 100 indicates a range of communication using the wireless communication circuit 51 appearing in FIG. 3. As shown in FIG. 5, when another camera 100 enters the communication range of each camera 100, the plurality of cameras 100 can establish a communication link between them to thereby perform data communication with each other. Note that the number of cameras 100 forming the image pickup system 101 is not limited to three. Two, or four or more cameras 100 may be included. Further, all of the other cameras 100 are not necessarily required to enter the communication range of each camera 100, but at least one of the other cameras 100 is required to enter the communication range of each camera 100. In this case, it is only required that the camera 100 performs data communication with a camera 100 outside the communication range via a camera 100 within the communication range. The plurality of cameras 100 may function as communication network nodes for relaying data. The plurality of cameras 100 establish a communication link which enables the cameras 100 to perform data communication with each other using the respective wireless communication circuits 51. When the communication link is established, the plurality of cameras 100 each perform setting processing for executing cooperative flickerless image pickup in which the influence of light source flicker is suppressed by cooperation. In the cooperative flickerless image pickup, one or some (part) of the cameras 100 measure(s) light source flicker, and information on light source flicker measured by the one or some of the cameras 100 is used in the image pickup control in the rest of the cameras 100. Therefore, in cooperative flickerless image pickup, first, it is necessary to make settings of assigning at least one camera 100 for measurement, which measures light source flicker, and cameras 100 for reception, which receive information without measuring light source flicker, with respect to the plurality of cameras 100 which have established the communication link.

FIGS. 6A and 6B are views each showing an example of a cooperative flickerless image pickup-setting screen. In response to a user's operation, the control unit 41 of the camera 100 appearing in FIG. 5 displays the setting screens shown in FIGS. 6A and 6B, on the display device 44 of the camera 100 appearing in FIG. 5. FIG. 6A shows a setting screen for selecting the plurality of cameras 100 that execute cooperative flickerless image pickup. On the setting screen shown in FIG. 6A, the plurality of cameras 100 having established the communication link are displayed as a list such that they can be individually selected. In FIG. 6A, CAMERA-A, CAMERA-B, and CAMERA-C are displayed as the three cameras 100 having established the communication link. A user can manually select and set the cameras 100 that execute cooperative flickerless image pickup by operating the touch panel device as the display device 44 or the operating switch 48. In FIG. 6A, all of three cameras 100 denoted as CAMERA-A, CAMERA-B, and CAMERA-C are set as the cameras 100 that execute cooperative flickerless image pickup. The setting may be configured such that the cameras 100 that execute cooperative flickerless image pickup are automatically set by clicking an automatic setting button 601. Note that as is clear from an automatic setting process, described hereinafter with reference to FIG. 7, in a case where manual setting is made, the priority is given to this manual setting. FIG. 6B shows a setting screen for selecting and setting the camera 100 for measurement (hereinafter referred to as "measurement camera 100" as deemed appropriate) and the camera 100 for reception (hereinafter referred to as "reception camera 100" as deemed appropriate) with respect to the plurality of cameras 100 selected for cooperative flickerless image pickup. On the setting screen shown in FIG. 6B, the plurality of cameras 100 selected on the selection screen shown in FIG. 6A are displayed as a list such that they can be separately selected. The user can manually select and set the measurement camera(s) 100 and the reception camera(s) 100 by operating the touch panel device as the display device 44 or the operating switch 48. Note that it is necessary to set at least one of the cameras 100 as the measurement camera 100 for measuring light source flicker after the start of continuous image pickup. In FIG. 6B, a camera B denoted as CAMERA-B is set as the measurement camera 100 for measuring light source flicker after the start of continuous image pickup. Cameras A and C denoted as CAMERA-A and CAMERA-C are set as the reception cameras 100 which do not measure light source flicker after the start of continuous image pickup. The setting may be configured such that the measurement camera 100 for measuring light source flicker after the start of continuous image pickup is automatically set by clicking an automatic setting button 602. Note that as is clear from the automatic setting process, described hereinafter with reference to FIG. 7, in a case where manual setting is made, the priority is given to this manual setting. The plurality of cameras 100 can be set, based on the above-mentioned user's operation, as the measurement camera(s) 100 which measure(s) light source flicker after the start of continuous image pickup and the reception camera(s) 100 which does/do not measure light source flicker.

Figure 7:
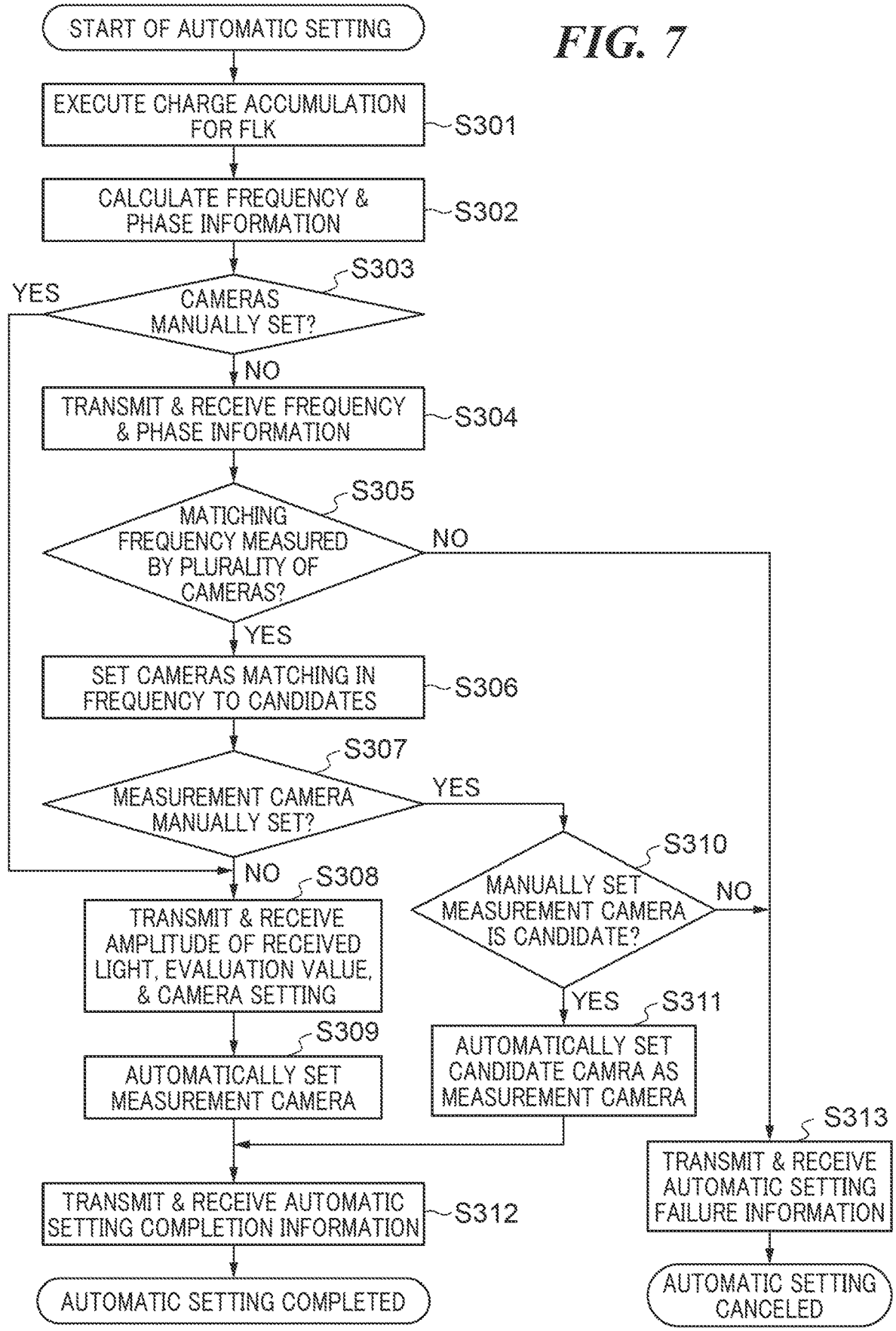
FIG. 7 is a flowchart of a process for automatically configuring a camera for measurement and a camera for reception, for cooperative flickerless image pickup.

FIG. 7 is a flowchart of the process for automatically configuring the measurement camera 100 and the reception camera 100 for cooperative flickerless image pickup. The automatic setting process in FIG. 7 is performed by the control unit 41 of the camera 100 operated by the user when the automatic setting button 601 or 602 is operated on the setting screen shown in FIG. 6A or 6B. Here, the camera 100 operated by the user is referred to as the master camera 100, and the other cameras 100 are referred to as the slave cameras 100. In a step S301, the control unit 41 of the master camera 100 measures light source flicker using the plurality of cameras 100. The control unit 41 transmits an instruction for measuring light source flicker from the wireless communication circuit 51 of the master camera 100. The slave cameras 100 having established the communication link perform light source flicker measurement processing. Further, the control unit 41 performs light source flicker measurement processing in the master camera 100. In this light source flicker measurement processing, the control unit 41 of the master camera 100 and the control units 41 of the slave cameras 100 measure changes in the luminance of a subject using the respective photometric sensors 26. Here, each control unit 41 instructs the photometric sensor 26 to repeat accumulation of charge in a thinned-out number of pixels and readout of signals therefrom in a short time period within a time period corresponding to the maximum one period of light source flicker. Each photometric sensor 26 repeats charge accumulation and signal readout at a cycle not lower than several times of the frequency of light source flicker. The signal processing circuit 42 converts signals read out from the photometric sensor 26 from analog to digital, and performs block integration of the digital signals for each cycle to generate measurement data indicative of changes in the luminance of the subject. As a result, data of changes in the luminance of the subject (object luminance change data), from which it is possible to measure light source flicker, is recorded in each of the plurality of cameras 100 having established the communication link.

In a step S302, the control unit 41 of the master camera 100 and the control units 41 of the slave cameras 100 each generate light source flicker information based on the subject luminance change data respectively measured. The control unit 41 functions as a light source flicker information generation unit. Each control unit 41 generates information on presence/absence of light source flicker, and further generates information on a frequency and a phase of light source flicker in a case where light source flicker is present. Further, each control unit 41 generates information on bright phase timing indicative of timing at which the subject luminance becomes maximum (becomes brightest) due to light source flicker, as the light source flicker information. Now, a method of calculating the light source flicker information is briefly described. The frequency of the light source flicker, determined based on the frequency of the commercial power supply, is roughly classified into 100 Hz and 120 Hz. Therefore, in a case where measurement data obtained by measuring the luminance of a subject at a period of 600/sec exists, the control unit 41 calculates an evaluation value F50 indicative of a degree of matching between frequency components of 100 Hz included in a plurality of section data items obtained by dividing the measurement data into data items each corresponding to six periods. Further, the control unit 41 calculates an evaluation value F60 indicative of a degree of matching between frequency components of 120 Hz included in a plurality of section data items obtained by dividing the measurement data into data items each corresponding to five periods. In the case of the evaluation value F50, as the degree of matching, there may be used by a minimum amplitude value out of amplitude values of the frequency components of 100 Hz, included in the plurality of section data items obtained by dividing the measurement data into the data items each corresponding to six periods, and in the case of the evaluation value F60, as the degree of matching, there may be used a minimum amplitude value out of amplitude values of the frequency components of 120 Hz included in the plurality of section data items obtained by dividing the measurement data into the data items each corresponding to five periods. In a case where light source flicker is not present, the evaluation value F50 and the evaluation value F60 are both small values. In a case where light source flicker of 100 Hz is present, the evaluation value F50 is large, but the evaluation value F60 is small. In a case where light source flicker of 120 Hz is present, the evaluation value F50 is small, but the evaluation value F60 is large. Further, the control unit 41 performs interpolation calculation on the measurement data to thereby reproduce a waveform of the frequency components corresponding to the large evaluation value F50 or F60, and identifies the timing at which the maximum value is obtained in the reproduced waveform as the bright phase timing of light source flicker. Further, the control unit 41 may calculate information on the amplitude of received light, caused by light source flicker, based on a difference between the maximum value and the minimum value in the temporal changes of the reproduced waveform.

In a step S303, the control unit 41 of the master camera 100 determines whether or not the plurality of cameras 100 that perform cooperative flickerless image pickup in continuous image pickup have been manually set on the setting screen shown in FIG. 6A. If the plurality of cameras 100 have been manually set, the control unit 41 proceeds to a step S308. If the plurality of cameras 100 have not been manually set, the control unit 41 proceeds to a step S304. In the step S304, the control unit 41 of the master camera 100 acquires the light source flicker information generated by the plurality of cameras 100, and compares the acquired information. The control units 41 of the slave cameras 100 each transmit the light source flicker information generated by itself from the wireless communication circuit 51 to the master camera 100. The wireless communication circuit 51 of the master camera 100 receives the light source flicker information from the slave cameras 100. The control unit 41 of the master camera 100 stores the light source flicker information of the slave cameras 100, received by the wireless communication circuit 51, in the RAM 41*d*.

In a step S305, the control unit 41 of the master camera 100 compares the light source flicker information items obtained by the plurality of cameras 100 including the self-apparatus. The control unit 41 of the master camera 100 compares the frequency of the light source flicker, included in the light source flicker information generated by all of the cameras 100. Then, if the matching frequency has been measured by at least some of the plurality of cameras 100, the control unit 41 of the master camera 100 finally determines that light source flicker is present, and proceeds to a step S306, whereas if not, the control unit 41 of the master camera 100 finally determines that light source flicker is not present, and proceeds to a step S313. Note that the control unit 41 of the master camera 100 may finally determine presence/absence of light source flicker by comparing other information included in the light source flicker information than the frequency. For example, the control unit 41 of the master camera 100 may perform the above-mentioned determination on the frequency in a case where the plurality of cameras 100 determine that light source flicker is present. Then, in a case where the plurality of cameras 100 do not determine that light source flicker is present, the control unit 41 of the master camera 100 may proceed to the step S313. In the step S306, the control unit 41 of the master camera 100 sets the plurality of cameras 100 having the same information in the light source flicker information as candidates for the measurement camera 100 for measuring light source flicker during continuous image pickup. In a step S307, the control unit 41 of the master camera 100 determines whether or not the measurement camera 100 for performing cooperative flickerless image pickup in continuous image pickup, has been set on the setting screen shown in FIG. 6B (note that here and in the following description, it is assumed that one camera is selected). If the measurement cameras 100 have been manually set, the control unit 41 proceeds to a step S310. If the measurement cameras 100 have not been manually set, the control unit 41 proceeds to the step S308.

In the step S308, the control unit 41 of the master camera 100 acquires the light source flicker information and the image pickup setting of the plurality of cameras 100. The control units 41 of the slave cameras 100 transmit the light source flicker information and the image pickup setting to the master camera 100 from the wireless communication circuits 51 thereof. The control unit 41 of the master camera 100 stores the received light source flicker information and the image pickup setting of the slave cameras 100 in the RAM 41d together with the light source flicker information and the image pickup setting of itself. The light source flicker information stored here includes e.g. information on the evaluation value of light source flicker and the light receiving amplitude. Further, the image pickup setting of the camera 100 includes e.g. information on the focal length of the interchangeable lens 2 and stability of the camera 100 determined based on the signals output from the shake detection circuit 53. In a step S309, the control unit 41 of the master camera 100 automatically sets the measurement camera 100 that performs cooperative flickerless image pickup in continuous image pickup. The control unit 41 of the master camera 100 sets the measurement camera 100 that perform cooperative flickerless image pickup in continuous image pickup from the candidates of the measurement cameras 100. The control unit 41 of the master camera 100 sets the measurement camera 100 e.g. by executing the following processing operations (1) to (4). After that, the control unit 41 of the master camera 100 proceeds to a step S312.

(1) The control unit 41 determines whether or not there is a camera 100 that can be regarded to be in a stable state based on information on the settings of each of the plurality of cameras 100. For example, in a case where image pickup is performed using a lens having focal length information of smaller than 50 mm for a wide angle of view, and at the same time, the camera 100 is in a stable state, such as a state fixed to a tripod, the control unit 41 determines that there is a camera 100 in a stable state. This is because the camera 100 having settings of the above-mentioned state has a high possibility that the camera 100 can continuously and stably measure light source flicker without being affected by shake and a panning operation.

(2) In a case where one camera 100 satisfies the above-described conditions (1), and the one camera 100 has a sufficient difference between the evaluation value F50 and the evaluation value F60, with the light receiving amplitude information exceeding a predetermined value, the control unit 41 sets the one camera 100 as the measurement camera 100. In a case where there is a sufficient difference between the evaluation value F50 and the evaluation value F60, there is a high possibility that it is possible to accurately measure changes in the brightness of light from the light source, caused by flickers.

(3) In a case where a plurality of cameras 100 satisfy the above-described conditions (1), the control unit 41 sets, out of the plurality of cameras 100, a camera 100 which is the largest in difference between the evaluation value F50 and the evaluation value F60, which are evaluation value information, as the measurement camera 100. In a case where a plurality of cameras 100 are the same in difference between the evaluation value F50 and the evaluation value F60, the control unit 41 sets a camera 100 which is the largest in light receiving amplitude information as the measurement camera 100.

(4) In a case where there is no camera 100 satisfying the above-described conditions (1), the control unit 41 sets a camera 100, out of the candidate cameras, which is the largest in difference between the evaluation value F50 and the evaluation value F60, which are the evaluation value information, as the measurement camera 100. In a case where a plurality of cameras 100 are the same in difference between the evaluation value F50 and the evaluation value F60, the control unit 41 sets a camera 100 which is the largest in light receiving amplitude information as the measurement camera 100.

In the step S310, the control unit 41 of the master camera 100 checks whether or not the camera 100 manually set to measure flicker in FIG. 6B is included in the candidates. If the manually set camera 100 is included in the candidates, the control unit 41 proceeds to a step S311. If the manually set camera 100 is not included in the candidates, the control unit 41 proceeds to the step S313. In the step S311, the control unit 41 of the master camera 100 sets the camera 100 which is manually set in FIG. 6B and is determined to be included in the candidates in the step S310, as the measurement camera 100. After that, the control unit 41 of the master camera 100 proceeds to the step S312.

In the step S312, the control unit 41 of the master camera 100 sets the cameras 100 other than the one set to the measurement camera 100 as the reception cameras 100, and performs processing for reflecting these automatic settings described heretofore. The control unit 41 of the master camera 100 transmits automatic setting completion information from the wireless communication circuit 51. The control unit 41 of each slave camera 100 stores the set value of the measurement camera 100 or the set value of the reception camera 100 in the RAM 41d thereof based on the automatic setting completion information received by the wireless communication circuit 51. Further, the control unit 41 of the master camera 100 stores the set value of the measurement camera 100 or the set value of the reception camera 100 in the RAM 41d thereof. Thus, preparation for cooperation continuous image pickup for the plurality of cameras 100 forming the image pickup system 101 is completed.

As a result of the comparison in the step S305, in a case where the matching frequency of the light source flicker is not included in the light source flicker information items obtained by the plurality of cameras 100, the control unit 41 of the master camera 100 proceeds to the step S313. Further, if it is determined in the step S310 that the camera 100 manually set to measure flicker is not included in the candidates, the control unit 41 of the master camera 100 proceeds to the step S313. In these cases, it is not desirable to perform cooperative flickerless image pickup in continuous image pickup. In the step S313, the control unit 41 of the master camera 100 transmits automatic setting failure information notifying that automatic setting of cooperative flickerless image pickup has failed to the slave cameras 100 from the wireless communication circuit 51. The control unit 41 of each slave camera 100 stops image pickup by cooperative flickerless image pickup based on the automatic setting failure information received by the wireless communication circuit 51. The control unit 41 of each slave camera 100 independently measures light source flicker based on the setting thereof in continuous image pickup.

Figure 8:
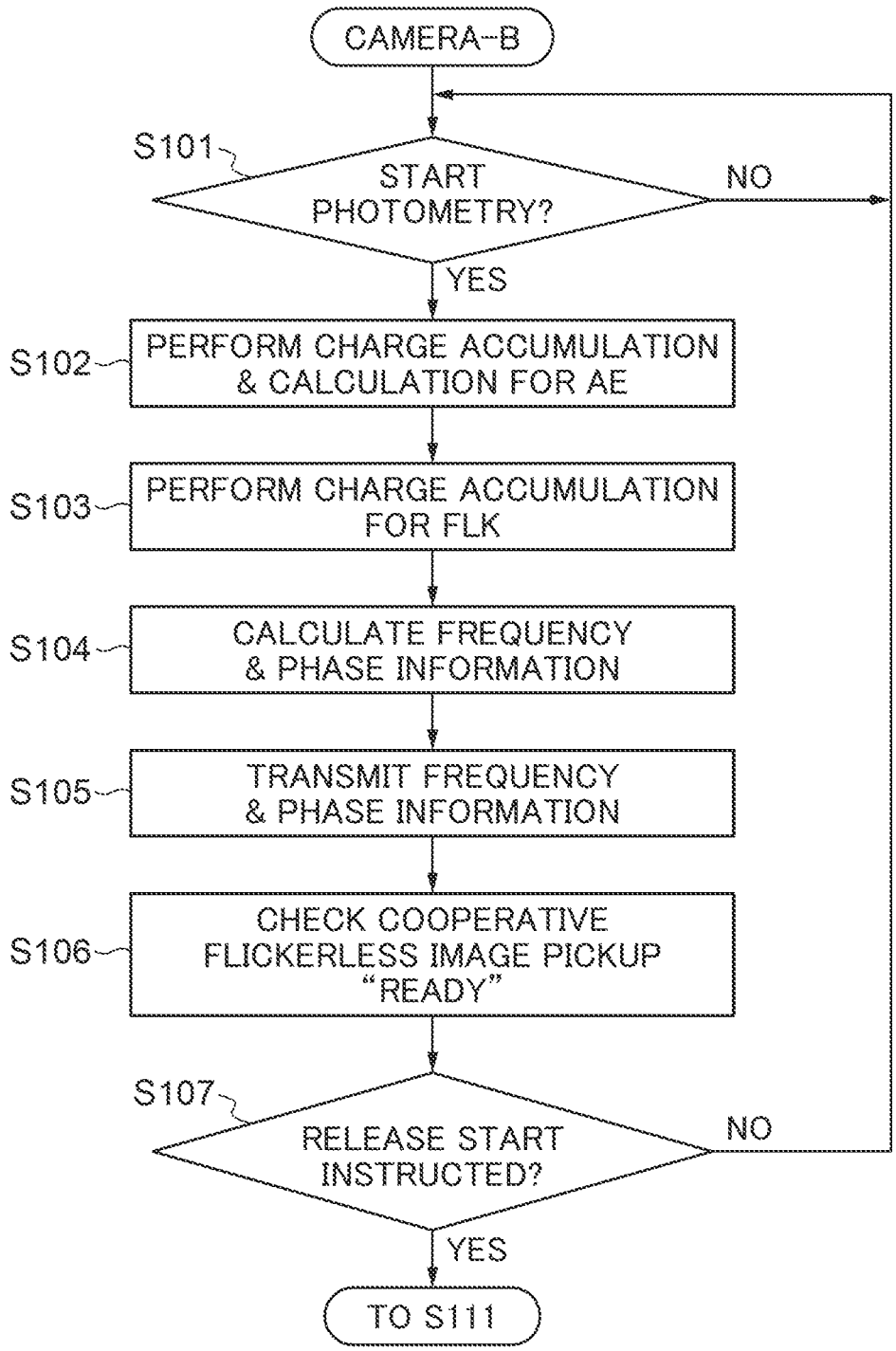
FIG. 8 is a flowchart of the first half of a continuous image pickup process performed by the camera for measurement.

Next, cooperative flickerless image pickup performed by the measurement camera 100 and the reception camera 100 will be described. Here, the description is given of a case where camera B as one of the three cameras 100 of the camera A, the camera B, and the camera C is set as the measurement camera 100 as shown in FIGS. 6A and 6B, by way of example. In this case, the camera A and the camera C as the rest of cameras 100 are set as the reception cameras 100. FIG. 8 is a flowchart of the first half of a continuous image pickup process performed by the measurement camera 100.

Figure 11:
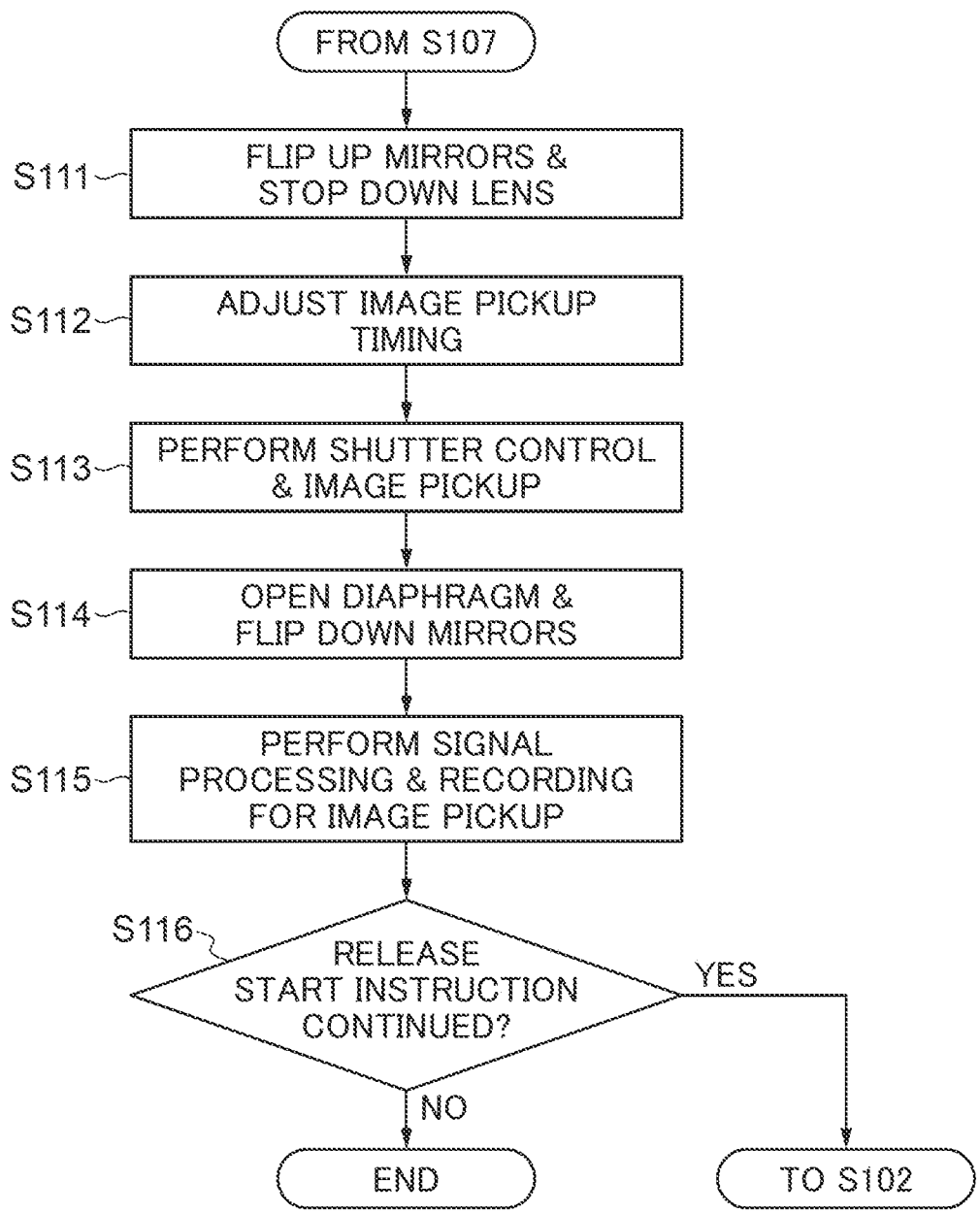
FIG. 11 is a flowchart of the latter half of the continuous image pickup process performed by the camera for measurement.

The control unit 41 of camera B as the measurement camera 100 performs the processes in FIGS. 8 and 11 in continuous image pickup. FIG. 8 shows the process until the first image to be recorded is picked up in the continuous image pickup process.

In a step S101 in FIG. 8, the control unit 41 of the camera B checks whether or not a photometry start instruction has been received. In a case where the camera B as the measurement camera 100 is the master camera 100 which is directly operated by the user, the control unit 41 may determine reception of a photometry start instruction based on whether or not a switch, out of the operating switch 48 thereof, for starting photometry has been operated. In a case where the camera B as the measurement camera 100 is the slave camera 100, the control unit 41 may determine reception of a photometry start instruction based on whether or not a photometry start instruction has been received by the wireless communication circuit 51. The control unit 41 of the camera B repeats the determination in the step S101 until the photometry start instruction is received. When the photometry start instruction is received, the control unit 41 of the camera B proceeds to a step S102.

In the step S102, the control unit 41 of the camera B performs AE processing, and causes the photometric sensor 26 to measure the luminance of a subject. In the AE processing, the photometric sensor 26 performs charge accumulation for full-pixel readout which enables face detection, and reads out signals. The signal processing circuit 42 converts the signals sequentially input from the photometric sensor 26 from analog to digital and stores the digital signals in the memory 43. Further, the signal processing circuit 42 generates image information based on the information obtained from all pixels, and performs face detection using a method, such as pattern matching. The signal processing circuit 42 calculates a photometry value as a subject luminance e.g. by performing block integration of input signals. The signal processing circuit 42 determines, based on the lens information acquired in advance, a shutter speed, an aperture value, an image pickup sensitivity, and so forth, suitable for image pickup adapted to the calculated photometry value of the subject. The signal processing circuit 42 stores these information items in the memory 43. In a step S103, the control unit 41 of the camera B causes the photometric sensor 26 to measure light source flicker. In this light source flicker measurement processing, the photometric sensor 26 performs charge accumulation by thinning out the number of pixels, and reads out signals in a short time. The signal processing circuit 42 converts the signals sequentially input from the photometric sensor 26 from analog to digital, and stores the digital signals in the memory 43. With this, the data of the plurality of pixels, acquired at a cycle not lower than several times of the frequency of the light source flicker, is stored in the memory 43. Further, the signal processing circuit 42 obtains brightness information indicative of changes in the luminance of the subject on a time-series basis e.g. by performing block integration of the signals input from the photometric sensor 26 for each cycle. In a step S104, the control unit 41 of the camera B calculates the light source flicker information, such as presence/absence of light source flicker, and the frequency and phase of light source flicker in a case where light source flicker is present, based on the brightness information on a time-series basis obtained over a plurality of cycles. In a step S105, the control unit 41 of the camera B transmits the light source flicker information generated by the calculation from the wireless communication circuit 51. The wireless communication circuits 51 of the camera A and the camera C, having established the communication link with the camera B, receive the light source flicker information generated by the camera B. In a step S106, the control unit 41 of the camera B determines whether or not information of "cooperative flickerless image pickup ready" transmitted from the camera A or the camera C has been received by the wireless communication circuit 51. Note that the transmission condition of the information of "cooperative flickerless image pickup ready" will be described hereinafter with reference to FIG. 9. If the information of "cooperative flickerless image pickup ready" has been received, the control unit 41 of the camera B displays information indicating preparation completion on the display device 44. In a step S107, the control unit 41 of the camera B determines whether or not a release start instruction has been received. In a case where the camera B is the measurement camera 100 which is directly operated by the user, the control unit 41 may determine reception of the release start instruction based on whether or not the release switch (include in the operating switch 48) thereof has been operated. In a case where the camera B is the slave camera 100 which is not directly operated by the user, the control unit 41 may determine reception of the release start instruction based on whether or not the wireless communication circuit 51 has received the release start instruction from the reception camera 100. In a case where a release start instruction has been received, the control unit 41 proceeds to a step S111. In a case where no release start instruction has been received yet, the control unit 41 of the camera B repeats the above-mentioned step.

Figure 9:
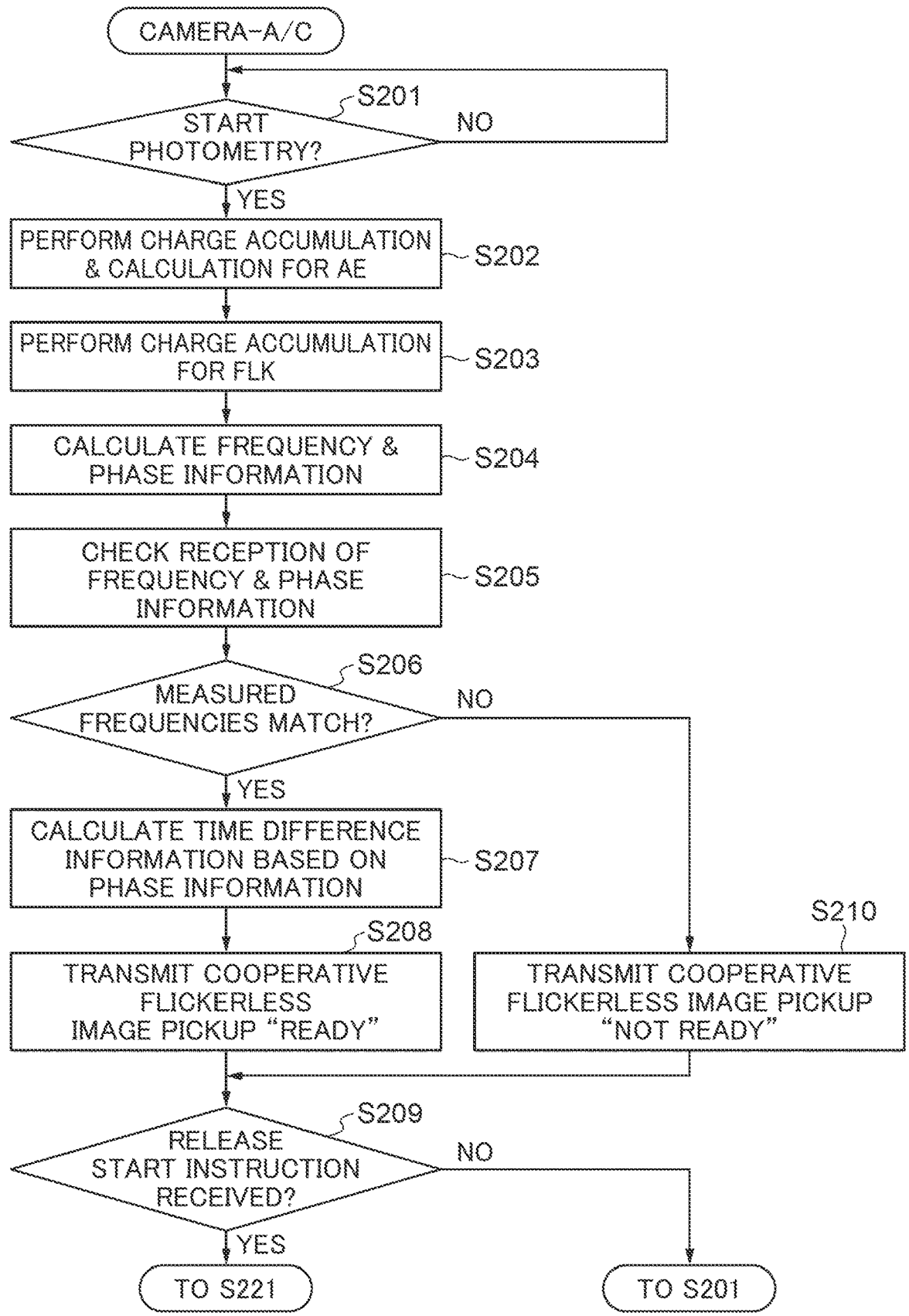
FIG. 9 is a flowchart of the first half of a continuous image pickup process performed by the camera for reception.

FIG. 9 is a flowchart of the first half of the continuous image pickup process performed by the reception camera 100. The camera A and the camera C as the reception cameras 100 perform the processes in FIGS. 9 and 12 in continuous image pickup. FIG. 9 shows the process until the first image to be recorded is picked up in the continuous image pickup process. For example, when a power switch, not shown, is turned on, or a communication link is established, the control units 41 of the camera A and the camera C start the process in FIG. 9 in the respective cameras 100. In a step S201, the control unit 41 of the camera A or the camera C checks whether or not a photometry start instruction has been received. In a case where the camera A or the camera C as the reception camera 100 is the master camera 100 which is directly operated by the user, the control unit 41 may determine reception of the photometry start instruction based on whether or not a switch thereof for starting photometry has been operated. In a case where the camera A or the camera C as the reception camera 100 is the slave camera 100, the control unit 41 may determine reception of the photometry start instruction based on whether or not the photometry start instruction has been received by the wireless communication circuit 51. The control unit 41 of the camera A or the camera C repeats the determination in the step S201 until the photometry start instruction is received. When the photometry start instruction is received, the control unit 41 of the camera A or the camera C proceeds to a step S202. In the step S202, the control unit 41 of the camera A or the camera C causes the photometric sensor 26 to measure the luminance of a subject. In a step S203, the control unit 41 of the camera A or the camera C causes the photometric sensor 26 to measure light source flicker. In a step S204, the control unit 41 of the camera A or the camera C calculates light source flicker information. These steps S202 to S204 are the same as the steps S102 to S104 executed by the camera B. In a step S205, the control unit 41 of the camera A or the camera C checks whether or not the light source flicker information transmitted by the camera B in the step S105 has been received by the wireless communication circuit 51.

In a step S206, the control unit 41 of the camera A or the camera C compares the light source flicker information received from the camera B with the light source flicker information generated by itself. For example, the control unit 41 of the camera A or the camera C compares information of presence/absence of light source flicker, and further compares the frequency in a case where light source flicker is present. If there is a match between the light source flicker information items, the control unit 41 proceeds to a step S207. In the step S207, the control unit 41 of the camera A or the camera C calculates time difference information between the camera B and the camera A or the camera C based on the information of bright phase timing, received from the camera B, and the information of bright phase timing, generated by itself. When the time difference information is generated, the camera A or the camera C is shifted to a state enabled to execute cooperative flickerless image pickup. Here, the control unit 41 functions as a time difference information generation unit. In a step S208, the control unit 41 of the camera A or the camera C transmits ready information indicative of completion of preparation from the wireless communication circuit 51. The wireless communication circuit 51 of the camera B receives the ready information.

In a step S209, the control unit 41 of the camera A or the camera C checks whether or not a release start instruction has been received. In a case where the camera A or the camera C is the measurement camera 100 which is directly operated by the user, the control unit 41 may determine reception of a release start instruction based on whether or not the release switch (included in the operating switch 48) thereof has been operated. In a case where the camera A or the camera C is the slave camera 100 which is not directly operated by the user, the control unit 41 may determine reception of the release start instruction based on whether or not the wireless communication circuit 51 has received the release start instruction from the reception camera 100. In a case where the release start instruction has been received, the control unit 41 proceeds to a step S221. In a case where the release start instruction has not been received yet, the control unit 41 returns to the step S201 to repeat the above-described steps.

As a result of the comparison in the step S206, if there is no match between the light source flicker information items, such as frequencies of light source flicker, the control unit 41 proceeds to a step S210. If there is no match between the light source flicker information items, there is a high possibility that a subject of which an image is to be picked up by the camera B and a subject of which an image is to be picked up by the camera A or the camera C exist in different light source environments. In the step S210, the control unit 41 of the camera A or the camera C transmits "not-ready" information indicative of a failure of preparation from the wireless communication circuit 51. The wireless communication circuit 51 of the camera B receives the "not-ready" information. After that, the control unit 41 proceeds to the step S209. In this case, the camera 100 having transmitted "not-ready" information is to independently perform continuous image pickup without cooperating with the other cameras 100.

Figure 10:
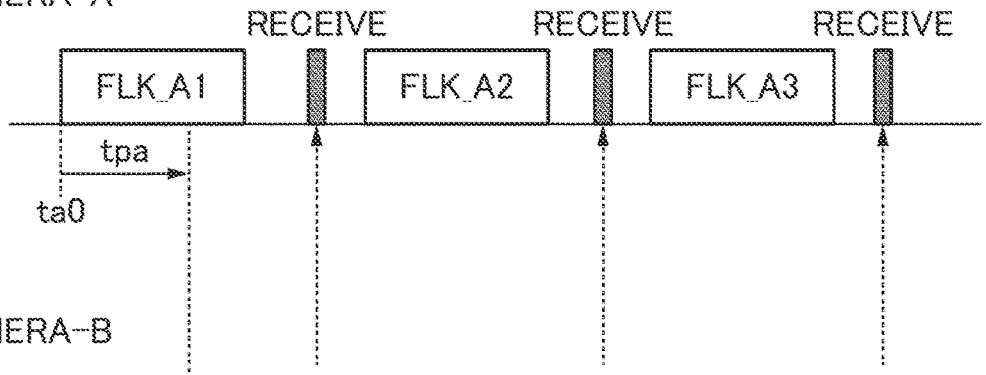
FIG. 10 is a timing diagram useful in explaining an example of a cooperation state of a plurality of cameras before the start of continuous image pickup.
Figure 10:
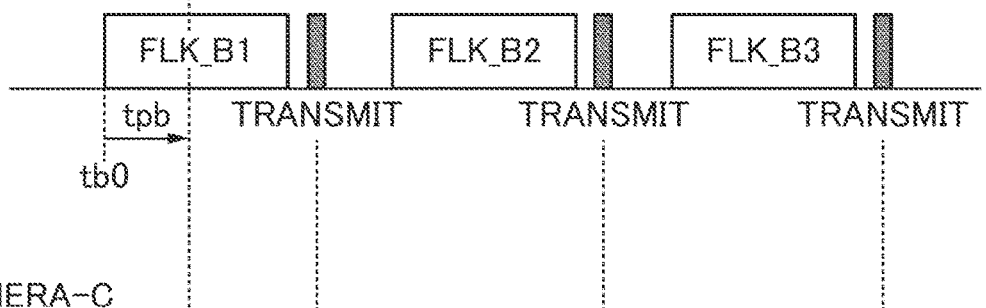
Figure 10:
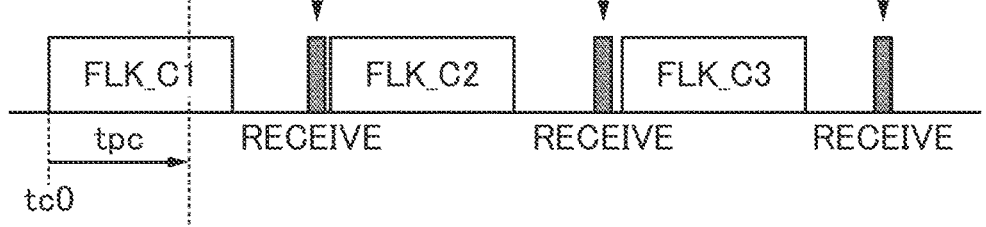
Figure 10:
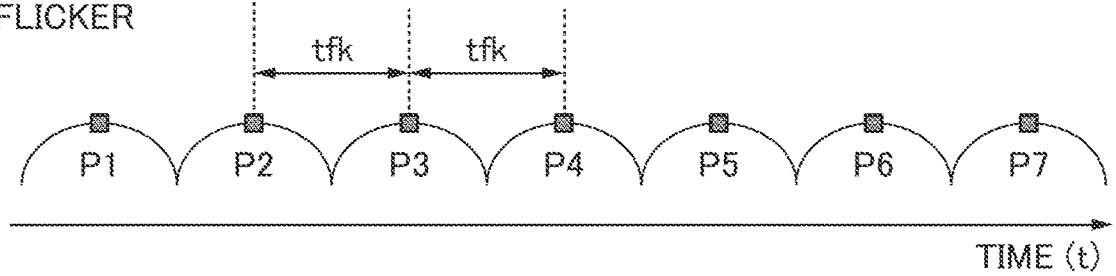

FIG. 10 is a timing diagram useful in explaining an example of a cooperation state of the plurality of cameras 100 before the start of continuous image pickup. (a) in FIG. 10 shows the operation of the camera A that is capable of performing continuous image pickup. (b) of FIG. 10 shows the operation of the camera B that is capable of performing continuous image pickup. (c) of FIG. 10 shows the operation of the camera C that is capable of performing continuous image pickup. (d) of FIG. 10 shows a waveform of light source flicker, corresponding to the operations shown in (a) to (c). Time elapses from left to right, as viewed in FIG. 10. In the light source flicker, bright phase timings (peaks) P1, P2, P3, . . . , repeatedly appear at a substantially constant period tfk. The camera B repeatedly performs the step S103 in FIG. 8 to execute charge accumulation processing for measuring flicker in the periods of FLK_B1, FLK_B2, . . . , as shown in (b) of FIG. 10. The camera A repeatedly performs the step S203 in FIG. 9 to execute charge accumulation processing for measuring flicker in the periods of FLK_A1, FLK_A2, . . . , as shown in (a) of FIG. 10. The camera C repeatedly performs the step S203 in FIG. 9 to execute charge accumulation processing for measuring flicker in the periods of FLK_C1, FLK_C2, . . . , as shown in (c) of FIG. 10. The three cameras 100 in FIG. 10 start the photometry operation when the master camera 100 of the three cameras is operated. However, the possibility is low that the three cameras 100 perform photometry at completely the same timing, e.g. due to a time lag of wireless communication, or variation in starting time of the camera 100. Further, in a case where the three cameras 100 each photograph a subject existing under the same light source environment, it is supposed that objects of these cameras 100 are similarly affected by light source flicker. In FIG. 10, the camera A calculates the period tfk and the bright phase timing tpa of the light source flicker based on the accumulation information obtained in the period FLK_A1, by setting, in the step S204, the reference time of the timer 41a included therein to an accumulation start timing ta0. The camera B calculates the period tfk and the bright phase timing tpb of the light source flicker based on the accumulation information obtained in the period FLK_B1, by setting, in the step S104, the reference time using the timer 41a included therein to an accumulation start timing tb0. The camera C calculates the period tfk and the bright phase timing tpc of the light source flicker based on the accumulation information obtained in the period FLK_C1, by setting the reference time of the timer 41a included therein to an accumulation start timing tc0. The timers 41a of the three cameras 100 each have independently started its operation, and are not synchronized with each other. Therefore, the reference times ta0, tb0, and tc0 are not the same time, and there are time differences between them. However, the three cameras 100 calculate a peak timing (position of P2) at which the same light source flicker is bright based on changes in the luminance of the subject existing in the same light source environment as the bright phase timings tpa, tpb, and tpc, respectively. Then, the camera B transmits the flicker period information tfk and the flicker bright phase timing information tpb to the camera A and the camera C in the step S105 in FIG. 8 whenever calculation of these information items is finished. The camera A receives these information items from the camera B. The camera A can calculate time difference information between the reference times ta0 and tb0 of the respective timers 41a of the cameras 100 based on a difference between the flicker bright phase timing information tpa calculated by itself and the flicker bright phase timing information tpb transmitted from the camera B. Further, the camera C receives these information items from the camera B. The camera C can calculate time difference information between the reference times tc0 and tb0 of the respective timers 41a of the cameras 100 based on a difference between the flicker bright phase timing information tpc calculated by itself and the flicker bright phase timing information tpb transmitted from the camera B. From the above, it is obvious that if image pickup is performed under the same light source environment, the bright phase timing of light source flicker, measured by each camera 100, is repeatedly generated at the period tfk. Even when the positions of the peak detected by the three cameras 100 are not the same, it is possible to calculate the time difference information by taking that into account.

The above description is given of the operations of the camera A, the camera B, and the camera C before the start of continuous image pickup. Next, the operation of each camera 100 after the start of continuous image pickup will be described. FIG. 11 is a flowchart of the latter half of the continuous image pickup process performed by the measurement camera 100. The control unit 41 of the camera B as the measurement camera 100 performs the process in FIG. 11 after the process in FIG. 8, in continuous image pickup. With this, the measurement camera 100 continuously generates the light source flicker information, and transmits the generated information to the reception cameras 100 during continuous image pickup. If it is determined in the step S107 in FIG. 8 that the release start instruction has been received (step S107), the control unit 41 of the camera B proceeds to a step S111. In the step S111, the control unit 41 of the camera B outputs a control signal to the first motor driver 46. The first motor driver 46 drives the first motor 47 to flip up the main mirror 13 and the first reflective mirror 14. Further, the control unit 41 of the camera B outputs the aperture information calculated in the step S102 to the lens control unit 71. The lens control unit 71 outputs a signal to the third motor driver 74 according to the aperture information input thereto. The third motor driver 74 drives the third motor 75 to shift the interchangeable lens 2 to a stopped-down state. In a step S112, the control unit 41 of the camera B waits until a delay time elapses, which is required to synchronize the image pickup timing with the bright phase timing of light source flicker based on the frequency and phase of light source flicker, calculated in the step S104. In a step S113, the control unit 41 of the camera B outputs a signal to the shutter driving unit 49 to shift the focal plane shutter 10 to an opened state. As a result, light enters the image pickup device 12 through the interchangeable lens 2. The image pickup device 12 is shifted to a state enabled to accumulate light from the subject. Further, the control unit 41 of the camera B sends an instruction to the signal processing circuit 42. The image pickup device 12 accumulates light from the subject, and reads out signals according to the accumulation time set according to the shutter time calculated in the step S102 and the readout gain set according to a predetermined image pickup sensitivity. When the image pickup operation is terminated, the control unit 41 of the camera B outputs a signal to the shutter driving unit 49 to shift the focal plane shutter 10 to a light shielding state. With this, the image pickup device 12 is shielded from light from the interchangeable lens 2. In a step S114, the control unit 41 of the camera B outputs a signal to the lens control unit 71 to open the diaphragm 31. The lens control unit 71 outputs a signal to the third motor driver 74 to open the diaphragm 31 using the third motor 75. Further, the lens control unit 71 outputs a signal to the first motor driver 46 to flip down the main mirror 13 and the first reflective mirror 14 using the first motor 47. In a step S115, the control unit 41 of the camera B instructs the signal processing circuit 42 to preform readout processing. The signal processing circuit 42 reads out photographed image information from the image pickup device 12, converts the information from analog to digital, and performs necessary correction processing and interpolation processing. The signal processing circuit 42 adjusts white balance of the picked-up image based on an instruction from the control unit 41. The signal processing circuit 42 compresses and converts the adjusted photographed image information to a recording file format, and stores the converted information in the storage unit 45. The storage unit 45 records image data in which the subject has been photographed. In a step S116, the control unit 41 of the camera B checks whether or not the release start instruction is continued. If the release start instruction is not continued, the control unit 41 terminates the continuous image pickup process in FIGS. 8 and 11. If the release start instruction is continued, the control unit 41 returns to the step S102, and repeats the above-described process. With this, the camera B continuously picks up images to be recorded. Thus, the camera B set as the camera 100 for measuring light source flicker after the start of continuous image pickup measures light source flicker to thereby generate the light source flicker information and transmits the generated light source flicker information to the reception cameras 100 whenever an image to be recorded is picked up during continuous image pickup.

Figure 12:
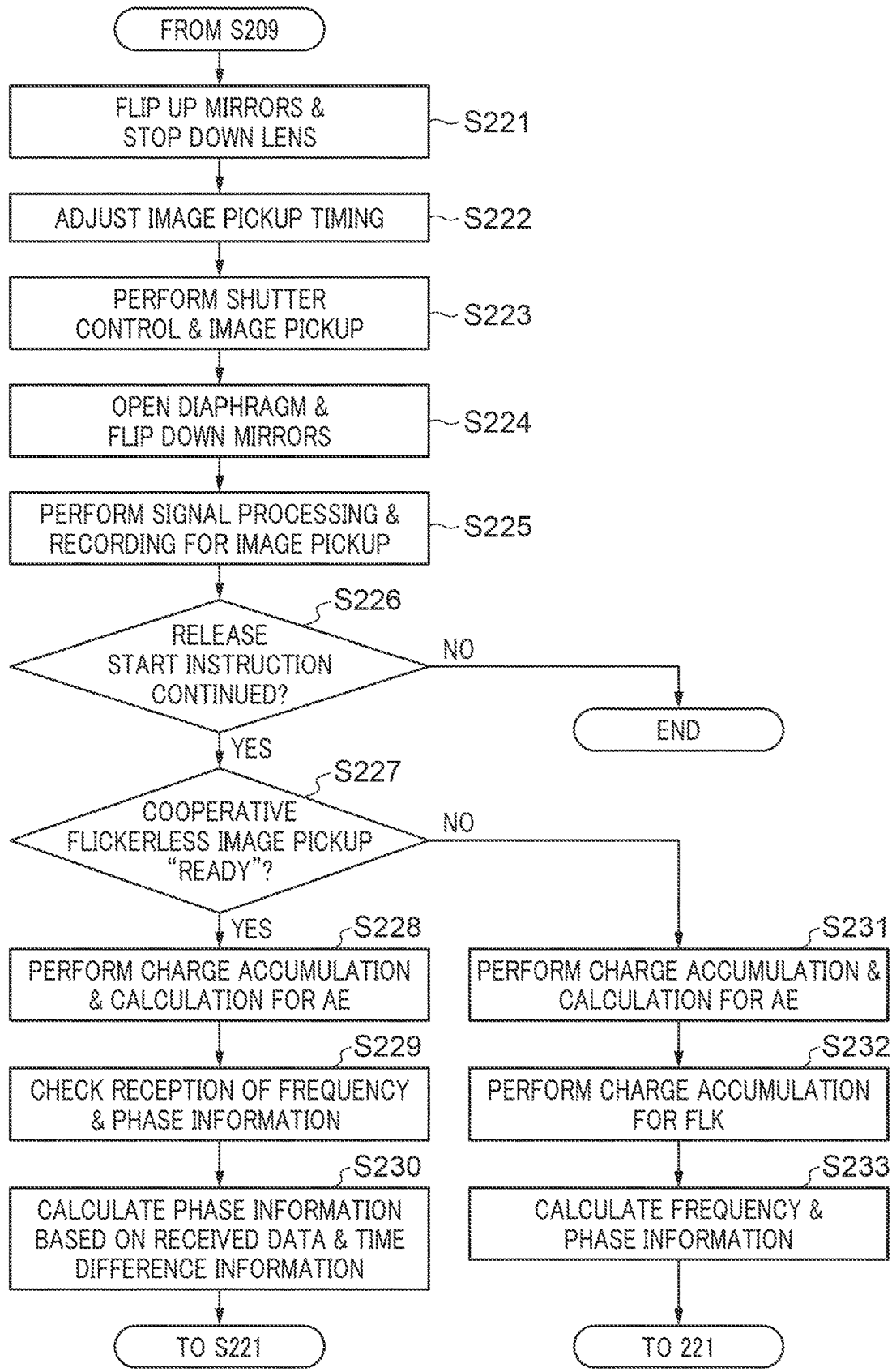
FIG. 12 is a flowchart of the latter half of the continuous image pickup process performed by the camera for reception.

FIG. 12 is a flowchart of the latter half of the continuous image pickup process performed by the reception camera 100. The control unit 41 of the camera A or the camera C as the reception camera 100 performs the process in FIG. 12 after the process in FIG. 9. With this, the reception camera 100 picks up images to be recorded using the light source flicker information continuously transmitted from the camera B set as the measurement camera 100 without measuring light source flicker during continuous image pickup. If it is determined in the step S209 in FIG. 9 that the release start instruction has been received, the control unit 41 of the camera A or the camera C proceeds to the step S221. In the step S221, the control unit 41 of the camera A or the camera C outputs a signal to the first motor driver 46 to flip up the main mirror 13 and the first reflective mirror 14 using the first motor 47. Further, the control unit 41 outputs the aperture information calculated in the step S202 to the lens control unit 71. The lens control unit 71 outputs a signal to the third motor driver 74 to drive the diaphragm 31 using the third motor 75. As a result, the interchangeable lens 2 is shifted to the stopped-down state. In a step S222, the control unit 41 of the camera A or the camera C waits until the lapse of a delay time elapses which is required to elapse so as to synchronize the image pickup timing with the bright phase timing of light source flicker, based on the phase information of the light source flicker. Here, the control unit 41 uses the frequency and the phase information of light source flicker, calculated in the step S204, at the first image pickup operation in continuous image pickup. The control unit 41 uses the frequency and the phase information of the light source flicker, calculated in a step S230, referred to hereinafter, at the second and subsequent image pickup operations in continuous image pickup. In a step S223, the control unit 41 of the camera A or the camera C outputs a signal to the shutter driving unit 49 to shift the focal plane shutter 10 to the opened state. As a result, light enters the image pickup device 12 through the interchangeable lens 2. The image pickup device 12 is shifted to a state enabled to accumulate light of a subject. Further, the control unit 41 sends an instruction to the signal processing circuit 42. The image pickup device 12 accumulates light from the subject, and reads out signals according to the accumulation time set according to the shutter time calculated in the step S202 and the readout gain set according to a predetermined image pickup sensitivity. When the image pickup operation is terminated, the control unit 41 outputs a signal to the shutter driving unit 49 to shift the focal plane shutter 10 to the light shielding state. With this, the image pickup device 12 is shielded from light from the interchangeable lens 2. In a step S224, the control unit 41 of the camera A or the camera C outputs a signal to the lens control unit 71 to open the diaphragm 31. The lens control unit 71 outputs a signal to the third motor driver 74 to open the diaphragm 31 using the third motor 75. Further, the lens control unit 71 outputs a signal to the first motor driver 46 to flip down the main mirror 13 and the first reflective mirror 14 using the first motor 47. In a step S225, the control unit 41 of the camera A or the camera C instructs the signal processing circuit 42 to preform readout processing. The signal processing circuit 42 reads out photographed image information from the image pickup device 12, converts the information from analog to digital, and performs necessary correction processing and interpolation processing. The signal processing circuit 42 adjusts white balance of the picked-up image based on an instruction from the control unit 41. The signal processing circuit 42 compresses and converts the adjusted photographed image information to a recording file format, and stores the converted information in the storage unit 45. The storage unit 45 records image data in which the subject has been photographed. In a step S226, the control unit 41 of the camera A or the camera C checks whether or not the release start instruction is continued. If the release start instruction is not continued, the control unit 41 terminates the continuous image pickup process in FIGS. 9 and 12. If the release start instruction is continued, the control unit 41 proceeds to a step S227.

In the step S227, the control unit 41 of the camera A or the camera C checks whether or not "ready" information has been transmitted to the camera B as the other camera 100 in the step S208 in FIG. 9. If the "ready" information has not been transmitted, the cooperative flickerless image pickup operation is not performed, and hence the control unit 41 proceeds to a step S231. If the "ready" information has been transmitted, the control unit 41 proceeds to a step S228 to perform the cooperative flickerless image pickup operation. In the step S228, the control unit 41 of the camera A or the camera C causes the photometric sensor 26 to measure the luminance of a subject. This processing is the same as the step S102. In a step S229, the control unit 41 of the camera A or the camera C acquires and checks the light source flicker information received by the wireless communication circuit 51. When the camera B generates the light source flicker information during continuous image pickup, the wireless communication circuit 51 repeatedly receives the light source flicker information from the camera B. The control unit 41 acquires and checks the latest light source flicker information received from the camera B during continuous image pickup. In the step S230, the control unit 41 of the camera A or the camera C calculates the next image pickup timing delayed so as to synchronize the image pickup timing with the bright phase timing of light source flicker based on the received light source flicker information and the time difference information. The light source flicker information received from the camera B is generated using the reference time tb0 set by the timer 41a of the camera B as the reference. The control unit 41 corrects the received light source flicker information of the measurement camera 100 to be adapted to the reference time ta0 thereof using the time difference information calculated in the step S207 in FIG. 9. With this, the camera A obtains the light source flicker information corrected with reference to the reference time ta0 thereof, and the camera C obtains the light source flicker information corrected with reference to the reference time tc0 thereof. The control unit 41 calculates the next image pickup timing delayed so as to synchronize the image pickup timing with the bright phase timing of light source flicker using the light source flicker information corrected in accordance with the reference time. After that, the control unit 41 returns to the step S221. With this, the camera A and the camera C set as the cameras 100 which do not measure light source flicker after the start of continuous image pickup continue continuous image pickup based on the cooperative flickerless image pickup operation. The camera A and the camera C basically receive the light source flicker information whenever an image to be recorded is picked up during continuous image pickup, and delays the image pickup timing so as to suppress the influence of light source flicker. The camera A and the camera C do not measure light source flicker by themselves during continuous image pickup.

In the step S231, the control unit 41 of the camera A or the camera C causes the photometric sensor 26 to measure the luminance of the subject. This processing is the same as the step S102. In a step S232, the control unit 41 of the camera A or the camera C controls the photometric sensor 26 to measure light source flicker. In a step S233, the control unit 41 of the camera A or the camera C calculates the light source flicker information. These processing operations are the same as the steps S102 to S104 executed by the camera B. After that, the control unit 41 returns to the step S221, and continues continuous image pickup.

Figure 13:
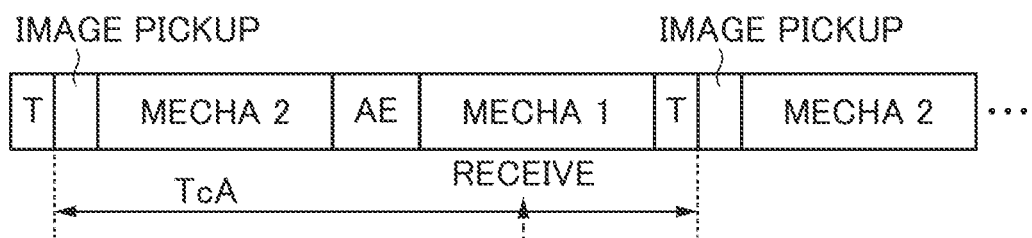
FIG. 13 is a timing diagram useful in explaining an example of a cooperation state of the plurality of cameras at one image pickup operation during continuous image pickup.
Figure 13:
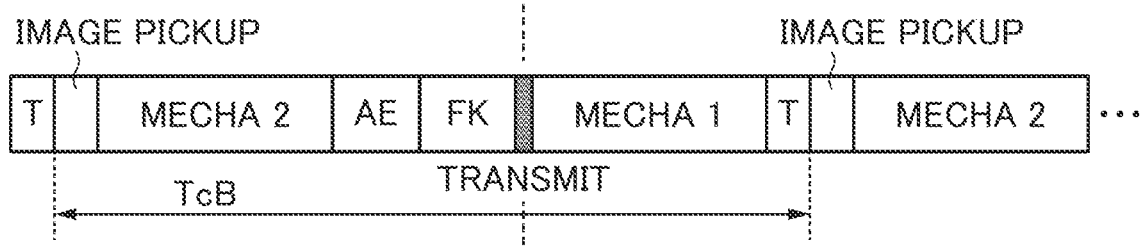
Figure 13:
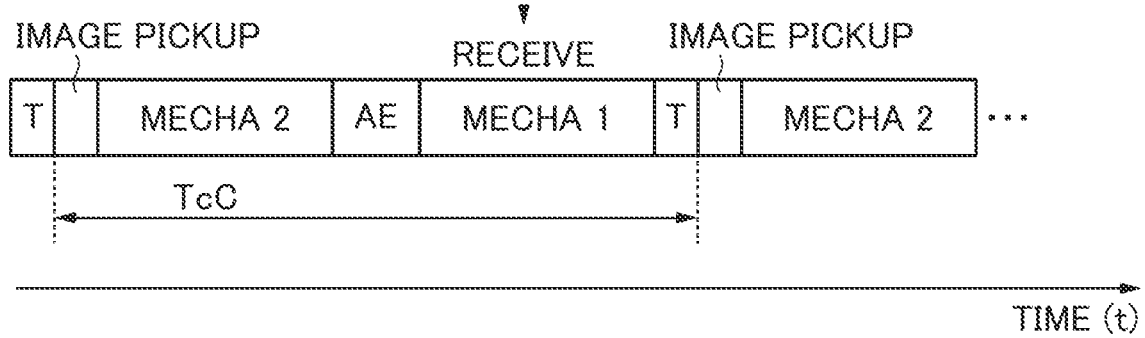

FIG. 13 is a timing diagram useful in explaining an example of the cooperation state of the plurality of cameras 100 at one image pickup operation timing during continuous image pickup, in which (a) of FIG. 13 shows the operation of the camera A, (b) of FIG. 13 shows the operation of the camera B, and (c) of FIG. 13 shows the operation of the camera C. Time elapses from left to right, as viewed in FIG. 13. The camera A as the reception camera 100 mainly repeats image pickup processing, mechanical driving processing (denoted as MECHA 2), AE processing, mechanical driving processing (denoted as MECHA 1), and delaying of image pickup timing (T). Here, the mechanical driving processing (MECHA 2) refers to processing for driving the first motor driver 46 to flip down the main mirror 13 and so forth after picking up an image. The AE processing refers to processing for measuring the luminance of a subject. The mechanical driving processing (MECHA 1) refers to processing driving the first motor driver 46 to flip up the main mirror 13 and the like. The same is applied to the camera C as the reception camera 100. Note that (T), (IMAGE PICKUP), and (MECHA 2) in the timing diagrams of the camera A and the camera C correspond to the steps S222, S223, and S224 in FIG. 12, respectively. Further, (AE) and (MECHA 1) correspond to the steps S228 and S221 in FIG. 12, respectively. The image pickup periods TcA and TcC of these reception cameras 100 are increased only by time for delaying of image pickup timing (T), compared with the normal case where a measurement is not taken against light source flicker, and is substantially the same as the normal image pickup period. On the other hand, the camera B as the measurement camera 100 mainly repeats image pickup processing, mechanical driving processing (MECHA 2), AE processing, measuring of light source flicker (FK), mechanical driving processing (MECHA 1), and delaying of image pickup timing (T). Note that (T), (IMAGE PICKUP), (MECHA 2), and (AE) in the timing diagram of the camera B correspond to the steps S112, S113, and S114 in FIG. 11, and the step S102 in FIG. 8, respectively. Further, (FK) and (MECHA 1) correspond to the step S103 in FIG. 8 and the step S111 in FIG. 11, respectively. Further, the timing denoted as "TRANSMISSION" after (FK) corresponds to the step S105 in FIG. 8. The camera B repeatedly transmits the generated light source flicker information to the camera A and the camera C whenever the light source flicker information is generated. The image pickup periods TcB of the measurement camera 100 is increased by time for delaying of image pickup timing and time for measuring of light source flicker (FK), compared with the normal case where the measurement is not taken against light source flicker, and is markedly longer than the normal image pickup period.

As described above, since the camera A and the camera C do not perform processing for generating light source flicker information (FK) in the self-apparatuses, the image pickup interval (time between photographed frames) in continuous image pickup is reduced by a time period corresponding to the light source flicker information generation processing. The camera A and the camera C can continuously photograph a plurality of images at the same image pickup interval (time between photographed frames) as that in the case where the countermeasure is not taken against light source flicker. Note that the camera B has the longer image pickup interval (time between photographed frames) than those of the camera A and the camera C because the camera B performs processing for measuring light source flicker. Therefore, there is a possibility that if the time period of continuous image pickup becomes too long, the camera B cannot generate and transmit the light source flicker information in time for the image pickup timing of the camera A and the camera C. In this case, the camera A and the camera C may photograph an image to be recorded using the same light source flicker information as the preceding one again. If image pickup is performed within approximately 0.2 sec after measuring the bright phase timing of light source flicker, an error or a change of the frequency of the light source flicker, caused due to the commercial power supply, hardly affects an image pickup result. Therefore, in a case where the image pickup interval tcb of the camera B during continuous shooing is within approximately 0.1 sec, it is possible to photograph an image to be recorded, in which the influence of light source flicker is properly suppressed. In a case where the same light source flicker information (delay information) as the preceding one is used again, the camera A and the camera C can photograph an image to be recorded, in which the influence of light source flicker is properly suppressed.

As described above, in the present embodiment, the control unit 41 of the reception camera 100 executes each image pickup operation in continuous image pickup at an image pickup timing delayed based on the light source flicker information received from the measurement camera 100. Therefore, the reception camera 100 is not required to periodically measure light source flicker, and generate light source flicker information by itself at each image pickup operation during continuous image pickup. Since the light source flicker is not measured by itself, an increase in image pickup interval in continuous image pickup in the reception camera 100 is reduced to the minimum only for adjusting the image pickup timing. What is more, the reception camera 100 can execute image pickup at an image pickup timing coping with periodical changes in brightness of a subject of which an image is to be picked up, caused by light source flicker, at each image pickup operation in continuous image pickup. Therefore, in a plurality of images photographed by continuous image pickup, it is possible to suppress the influence of periodical changes in brightness of a subject, caused by light source flicker. The reception camera 100 can execute each image pickup operation in continuous image pickup e.g. at a timing in which the subject becomes bright such that the influence of light source flicker is suppressed, and photograph a plurality of images which are uniform in bright image quality. An image in which a subject is darkly photographed is hardly included in the plurality of images obtained through continuous image pickup.

As described above, in the present embodiment, the plurality of cameras 100 are made communicable with each other to cooperate with each other, and the light source flicker information generated by the measurement camera 100 is transmitted from the measurement camera 100 to the reception camera 100. Therefore, for example, the reception camera 100 can obtain the light source flicker information generated during continuous image pickup, and perform continuous image pickup in which the influence of light source flicker is suppressed without performing measurement processing for generating light source flicker information by itself. The reception camera 100 can perform continuous image pickup in which the influence of light source flicker is suppressed while preventing an increase of the image pickup interval. In the present embodiment, the reception camera 100 determines a match between the light source flicker information generated by the reception camera 100 and the light source flicker information generated by the measurement camera 100 before starting the image pickup operation in continuous image pickup. For example, the reception camera 100 determines a match between the information of the frequency of light source flicker, generated by the reception camera 100, and the information of the frequency of light source flicker, generated by the measurement camera 100. Then, if it is determined that there is a match between the light source flicker information items, the reception camera 100 executes the image pickup operation in continuous image pickup based on the light source flicker information received from the measurement camera 100 without generating the light source flicker information by the reception camera 100. Therefore, the reception camera 100 can perform continuous image pickup in cooperation with the measurement camera 100 only in a case where it is possible to confirm that the measurement camera 100 performs image pickup under the same light source environment as that of the reception camera 100. In the present embodiment, before starting the image pickup operation in continuous image pickup, the reception camera 100 generates time difference information indicative of a time difference for use in determining a phase of a light source. The time difference for determining the phase of a light source is a time difference between the light source flicker information generated by the reception camera 100 and the light source flicker information received from the measurement camera 100 by the wireless communication circuit 51. Then, the control unit 41 that executes each image pickup operation in continuous image pickup performs the image pickup operation at an image pickup timing delayed such that the image pickup timing is synchronized with the bright phase of the light source based on the time difference information and the light source flicker information received from the measurement camera 100. Therefore, the plurality of recorded images obtained through continuous image pickup are made uniform in bright image quality, and an image in which the subject is darkly photographed is hardly included in the plurality of images obtained through continuous image pickup. In the present embodiment, the measurement camera 100 and the reception camera 100 are automatically selected by the control unit 41 provided in at least one of the plurality of cameras 100. The measurement camera 100 generates and transmits light source flicker information during continuous image pickup. The reception camera 100 receives the light source flicker information during continuous image pickup. The control unit 41 selects the measurement camera 100 and the reception camera 100 out of the plurality of cameras 100 before starting the image pickup operation in continuous image pickup. The control unit 41 selects the camera 100 based on the evaluation value of light source flicker and the light receiving amplitude of light source flicker, measured by each of the plurality of cameras 100, and the image pickup setting set for each of the cameras 100. As the image pickup setting used here, for example, the focal length of the interchangeable lens 2 and the stability of the camera 100 are used. With this, the image pickup system 101 can automatically assign the camera 100 which is suitable for measuring light source flicker in continuous image pickup as the measurement camera 100, and the other cameras 100 as the reception cameras, with respect to the plurality of cameras 100.

The present invention has been described heretofore based on the embodiment thereof. However, the present invention is not limited to this embodiment, but it is to be understood that the invention includes various forms within the scope of the gist of the present invention.

For example, in the above-described embodiment, the camera B as the measurement camera 100 that measures light source flicker during continuous image pickup continuously performs the image pickup operation also by itself during continuous image pickup. However, the camera B as the measurement camera 100 may measure light source flicker during continuous image pickup, and transmit the light source flicker information to the other reception cameras 100 without continuously performing the image pickup operation during continuous image pickup.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-119046 filed Jun. 22, 2018, which is hereby incorporated by reference herein in its entirety.

What is claimed is:

1. An image pickup apparatus comprising:
   a photometric sensor for measuring a luminance of a subject of which an image is to be picked up; and
   at least one processor or circuit configured to perform the operations of the following units:
   a flicker information generation unit configured to detect changes in brightness, caused by a light source, with respect to the subject, using the photometric sensor, and to generate first flicker information;
   a communication unit configured to periodically receive, from another apparatus different from the image pickup apparatus, second flicker information generated by the another apparatus, during continuous image pickup;
   a determination unit configured to determine a degree of matching between the first flicker information generated by the flicker information generation unit and the second flicker information received from the another apparatus, before starting the continuous image pickup; and
   a control unit configured to control execution of each image pickup operation during the continuous image pickup,
   wherein in a case where it is determined by the determination unit that the degree of matching between the first flicker information and the second flicker information is not lower than a predetermined value, the control unit controls execution of each image pickup operation during the continuous image pickup such that each image pickup operation is executed at a timing determined based on the second flicker information periodically received from the another apparatus by the communication unit without causing the flicker information generation unit to generate the first flicker information.

2. The image pickup apparatus according to claim 1, wherein in a case where the flicker information generation unit generates the first flicker information during the continuous image pickup, the communication unit transmits the generated first flicker information to the another apparatus.

3. The image pickup apparatus according to claim 1, wherein the first flicker information is at least information on a frequency of flicker, and
   wherein the determination unit determines at least a degree of matching between a frequency of flicker based on the first flicker information and a frequency of flicker based on the second flicker information.

4. The image pickup apparatus according to claim 1, wherein the at least one processor or circuit is configured to further perform the operation of a time difference measurement unit configured to generate time difference information indicative of a time difference for use in determining a phase of the light source, based on the first flicker information and the second flicker information, before starting the continuous image pickup, and wherein the control unit controls execution of each image pickup operation during the continuous image pickup such that timing of each image pickup operation is delayed to a bright phase of the light source, based on the time difference information and the second flicker information.

5. An image pickup system that causes a plurality of image pickup apparatuses capable of performing continuous image pickup to cooperate with each other,
   wherein the plurality of image pickup apparatuses include communication units which can communicate with each other, respectively,
   wherein at least one image pickup apparatus for measurement as part of the plurality of image pickup apparatuses, comprises:
   a photometric sensor for measuring a luminance of a subject of which an image is to be picked up; and
   at least one processor or circuit configured to perform the operation of a flicker information generation unit configured to periodically detect changes in brightness, caused by a light source, with respect to the subject, using the photometric sensor, and to generate flicker information, during continuous image pickup, and
   transmits the flicker information periodically generated during the continuous image pickup from a communication unit of its own, and
   wherein at least one image pickup apparatus for reception as the rest of the plurality of image pickup apparatuses receives the flicker information of the image pickup apparatus for measurement, periodically transmitted from the communication unit of the image pickup apparatus for measurement, during the continuous image pickup, by the communication unit of the image pickup apparatus for reception, and
   comprises at least one processor or circuit configured to perform the operation of a control unit configured to control execution of each image pickup operation during continuous image pickup such that each image pickup operation is executed at a timing determined based on the flicker information of the image pickup apparatus for measurement, periodically received during the continuous image pickup,
   wherein the image pickup apparatus for reception comprises:
   a photometric sensor for measuring the luminance of a subject of which an image is to be picked up, and
   wherein the at least one processor or circuit of the image pickup apparatus for reception is configured to further perform the operations of the following units:
   a flicker information generation unit configured to periodically detect changes in brightness, caused by a light source, with respect to the subject, using the photometric sensor, to generate flicker information, during the continuous image pickup, and
   a determination unit configured to determine a degree of matching between the flicker information generated by the flicker information generation unit and the flicker information generated by the flicker information generation unit of the image pickup apparatus for measurement and received by the communication unit, before starting the continuous image pickup, and
   wherein the control unit of the image pickup apparatus for reception controls execution of each image pickup operation during the continuous image pickup, in a case where it is determined by the determination unit that the degree of matching between the flicker information generated by the flicker information generation unit and the flicker information received by the communication unit is not lower than a predetermined value, such that each image pickup operation in the continuous image pickup is executed based on the flicker information received from the image pickup apparatus for measurement, without causing the flicker information generation unit to periodically detect changes in brightness, caused by the light source, to generate flicker information.

6. The image pickup system according to claim 5, wherein the flicker information is at least information on a frequency of flicker, and
   wherein the determination unit determines at least a degree of matching between a frequency of flicker based on the flicker information generated in the image pickup apparatus for reception and a frequency of flicker based on the flicker information generated in the image pickup apparatus for measurement.

7. The image pickup system according to claim 5, wherein the at least one processor or circuit of the image pickup apparatus for reception is configured to further perform the operation of a time difference measurement unit configured to generate time difference information indicative of a time difference for use in determining a phase of the light source, based on the flicker information generated in the image pickup apparatus for reception and the flicker information generated in the image pickup apparatus for measurement and received by the communication unit, before starting the continuous image pickup, and
   wherein the control unit of the image pickup apparatus for reception controls execution of each image pickup operation during the continuous image pickup such that timing of each image pickup operation is delayed to a bright phase of the light source, based on the time difference information and the flicker information generated in the image pickup apparatus for measurement.

8. A method of controlling an image pickup apparatus that includes a photometric sensor for measuring a luminance of a subject of which an image is to be picked up, comprising:
   detecting changes in brightness, caused by a light source, with respect to the subject, to generate first flicker information using the photometric sensor;
   periodically receiving, from another apparatus, second flicker information generated by the another apparatus, during continuous image pickup;
   determining a degree of matching between the first flicker information and the second flicker information received from the another apparatus, before starting the continuous image pickup; and
   executing, in a case where it is determined that the degree of matching between the first flicker information and the second flicker information is not lower than a predetermined value, each image pickup operation at a timing determined based on the second flicker information periodically received from the another apparatus, without generating the first flicker information, during the continuous image pickup.

9. A non-transitory computer-readable storage medium storing a computer-executable program for executing a method of controlling an image pickup apparatus that includes a photometric sensor for measuring a luminance of a subject of which an image is to be picked up,
   wherein the method comprises:
   detecting changes in brightness, caused by a light source, with respect to the subject, to generate first flicker information using the photometric sensor;

periodically receiving, from another apparatus, second flicker information generated by the another apparatus, during continuous image pickup;

determining a degree of matching between the first flicker information and the second flicker information received from the another apparatus, before starting the continuous image pickup; and executing, in a case where it is determined that the degree of matching between the first flicker information and the second flicker information is not lower than a predetermined value, each image pickup operation at a timing determined based on the second flicker information periodically received from the another apparatus, without generating the first flicker information, during the continuous image pickup.

* * * * *